US011456904B2

United States Patent
Gurelli et al.

(10) Patent No.: US 11,456,904 B2
(45) Date of Patent: Sep. 27, 2022

(54) NUMEROLOGIES FOR DISTRIBUTING AN EXCESS CYCLIC PREFIX DURING ORTHOGONAL FREQUENCY-DIVISION MULTIPLEXING

(71) Applicant: QUALCOMM Incorporated, San Diego, CA (US)

(72) Inventors: Mehmet Izzet Gurelli, San Diego, CA (US); Qiang Wu, San Diego, CA (US); Jing Sun, San Diego, CA (US); Xiaoxia Zhang, San Diego, CA (US); Tao Luo, San Diego, CA (US); Iyab Issam Sakhnini, San Diego, CA (US); Jun Ma, San Diego, CA (US); Ahmed Abdelaziz Ibrahim Abdelaziz Zewail, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/214,027

(22) Filed: Mar. 26, 2021

(65) Prior Publication Data

US 2021/0328843 A1 Oct. 21, 2021

Related U.S. Application Data

(60) Provisional application No. 63/011,182, filed on Apr. 16, 2020.

(51) Int. Cl.
*H04L 27/26* (2006.01)

(52) U.S. Cl.
CPC .... *H04L 27/2607* (2013.01); *H04L 27/26025* (2021.01)

(58) Field of Classification Search
CPC ...................... H04L 27/2607; H04L 27/26025
See application file for complete search history.

(56) References Cited

U.S. PATENT DOCUMENTS

| 2018/0123849 | A1* | 5/2018 | Si | H04J 11/0073 |
| 2019/0075006 | A1* | 3/2019 | Yi | H04L 27/26 |
| 2021/0044470 | A1* | 2/2021 | Ciochina | H04L 27/2636 |

FOREIGN PATENT DOCUMENTS

| CN | 101425888 A | 5/2009 |
| WO | 2017204717 A1 | 11/2017 |
| WO | 2018048053 A1 | 3/2018 |

OTHER PUBLICATIONS

Intel Corporation: "Time Interval Alignment Between Different Numerologies", 3GPP Draft, 3GPP TSG RAN WG1 Meeting #86, R1-166553, NR Time Interval Alignment, 3rd Generation Partnership Project (3GPP), Mobile Competence Centre; 650, Route Des Lucioles; F-06921, Sophia-Antipolis Cedex; France, vol. RAN WG1, No. Gothenburg, Sweden, Aug. 22, 2016-Aug. 26, 2016, Aug. 21, 2016 (Aug. 21, 2016), XP051125445, 5 pages, Retrieved from the Internet: URL: http://www.3gpp.org/ftp/Meetings_3GPP_SYNC/RAN1/Docs/ [retrieved on Aug. 21, 2016] figure 1b.

(Continued)

*Primary Examiner* — Janice N Tieu
(74) *Attorney, Agent, or Firm* — Loza & Loza LLP

(57) ABSTRACT

Orthogonal frequency-division multiplexing (OFDM) numerologies that maintain symbol boundary alignment while distributing excess cyclic prefixes (CPs) among OFDM symbols. Communication is established using a first sub-carrier spacing (SCS) and a first OFDM numerology, such as an exemplary numerology that distributes excess CP duration among a set of symbols that occupy a time interval within or equal to a corresponding time interval of a symbol of a second OFDM numerology with a second lower SCS. The first SCS may be, e.g., 960 kHz. The second SCS may (Continued)

be, e.g., 120 kHz. Another exemplary OFDM numerology described herein distributes the excess CP as prefix and postfix portions to one of the symbols, such as the first symbol of a set. Communication then proceeds using the first OFDM numerology at the first SCS and, in illustrative examples, using the second OFDM numerology at the second SCS or other OFDM numerologies at other SCSs.

30 Claims, 23 Drawing Sheets

(56) References Cited

OTHER PUBLICATIONS

Partial International Search Report—PCT/US2021/024649—ISA/EPO—dated Jun. 2, 2021.
Samsung: "Discussion on Symbol Alignment Across Scaled Numerology," 3GPP Draft, 3GPP TSG RAN WG1#86, R1-166753, NR Symbol Alignment, 3rd Generation Partnership Project (3GPP), Mobile Competence Centre; 650, Route Des Lucioles; F-06921, Sophia-Antipolis Cedex; France, vol. RAN WG1, No. Gothenburg, Sweden, Aug. 22, 2016-Aug. 26, 2016, Aug. 12, 2016 (Aug. 12, 2016), XP051141919, 4 pages, Retrieved from the Internet: URL: http://www.3gpp.org/ftp/tsg_ran/WG1_RL1/TSGR1_86/Docs/ [retrieved on Aug. 12, 2016] figure 2.
Samsung: "Time Alignment Among Different Numerologies for Same CP Overhead", 3GPP Draft, 3GPP TSG RAN WG1#86bis, R1-1609048-NR Time Alignment (Same CP OH), 3rd Generation Partnership Project (3GPP), Mobile Competence Centre; 650, Route Des Lucioles; F-06921, Sophia-Antipolis Cedex; France, vol. RAN WG1, No. Lisbon, Portugal, Oct. 10, 2016-Oct. 14, 2016, Oct. 9, 2016 (Oct. 9 2016), XP051149100, 3 pages, Retrieved from the Internet: URL: http://www.3gpp.org/ftp/Meetings_3GPP_SYNC/RAN1/Docs/ [retrieved on Oct. 9, 2016) figure 1.
International Search Report and Written Opinion—PCT/US2021/024649—ISA/EPO—dated Jul. 15, 2021.
LG Electronics: "Discussion on Alignment for Different Numerology Multiplexing", 3GPP Draft, 3GPP TSG RAN WG1 Meeting #86, R1-166878 Numerology Multiplexing, 3rd Generation Partnership Project (3GPP), Mobile Competence Centre; 650, Route Des Lucioles; F-06921, Sophia-Antipolis Cedex; France, vol. RAN WG1, No. Gothenburg, Sweden; Aug. 22, 2016-Aug. 26, 2016, Aug. 13, 2016 (Aug. 13, 2016), XP051132935, 5 pages, Retrieved from the Internet: URL: http://www.3gpp.org/ftp/tsg_ran/WG1_RL1/TSGR1_86/Docs/[retrieved on Aug. 13, 2016] paragraph [2 .2.1] figure 1.
Qualcomm, et al., WF on Scalable Numerology Symbol Boundary Alignment, 3GPP Draft, 3GPP TSG RAN WG1 #85, R1-165583_SCALABLE_NUMEROLOGY_SYMBOL_ALIGNMENT, 3rd Generation Partnership Project (3GPP), Mobile Competence Centre; 650, Route Des Lucioles; F-06921, Sophia-Antipolis Cedex; France, vol. RAN WG1, No. Nanjing, China, May 23, 2016-May 27, 2016, May 30, 2016 (May 30, 2016), XP051111774, 6 pages, Retrieved from the Internet: URL: http://www.3gpp.org/ftp/tsg_ran/WG1_RL1/TSGR1_85/Docs/ [retrieved on May 30, 2016] p. 2-p. 3 p. 6.

* cited by examiner

Mixed Numerology

NUMEROLOGIES FOR DISTRIBUTING AN EXCESS CYCLIC PREFIX DURING ORTHOGONAL FREQUENCY-DIVISION MULTIPLEXING

CROSS-REFERENCE TO RELATED APPLICATIONS

This application claims priority based on U.S. Provisional Patent Application Ser. No. 63/011,182, filed Apr. 16, 2020, for "NUMEROLOGIES FOR DISTRIBUTING AN EXCESS CYCLIC PREFIX DURING ORTHOGONAL FREQUENCY-DIVISION MULTIPLEXING," which is assigned to the assignee hereof and incorporated by reference herein in its entirety.

FIELD OF THE DISCLOSURE

The technology discussed herein generally relates to wireless communication systems, and more particularly, to the distribution of excess cyclic prefixes.

DESCRIPTION OF RELATED ART

In mobile broadband systems or other wireless communication systems, a numerology refers to a set of operating parameters deployed in a wireless communication system. One exemplary numerology includes orthogonal frequency-division multiplexing (OFDM) operating parameters that define and control how data or information may be transmitted using OFDM radio access technology. As the demand for mobile broadband access increases, research and development continue to advance wireless communication technologies that employ OFDM, not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the disclosure provides a scheduling entity of a wireless communication system. The scheduling entity includes a communication interface configured for wireless communication and a processor operatively coupled to the communication interface. The processor is configured to: establish communication with a user equipment (UE) using a first sub-carrier spacing (SCS) and a first orthogonal frequency-division multiplexing (OFDM) numerology wherein (a) an excess cyclic prefix (CP) is distributed among a set of symbols that occupy a time interval within or equal to a corresponding time interval of a symbol of a second OFDM numerology with a second SCS that is lower than the first SCS or (b) the excess CP is distributed as prefix and postfix portions to one of the symbols of the set of symbols; and communicate with the UE via the communication interface using the first OFDM numerology at the first SCS.

In another aspect of the disclosure, a method is provided for wireless communication for use by a scheduling entity. The method includes establishing communication with a UE using a first SCS and a first OFDM numerology wherein (a) an excess cyclic prefix (CP) is distributed among a set of symbols that occupy a time interval within or equal to a corresponding time interval of a symbol of a second OFDM numerology of a second SCS that is lower than the first SCS or (b) the excess CP is distributed as prefix and postfix portions to one of the symbols of the set of symbols. The method includes communicating with the UE using the first OFDM numerology at the first SCS.

Another aspect of the disclosure provides a UE of a wireless communication system. The UE includes a communication interface configured for wireless communication and a processor operatively coupled to the communication interface. The processor is configured to: establish communication with a base station using a first SCS and a first OFDM numerology wherein (a) an excess CP is distributed among a set of symbols that occupy a time interval within or equal to a corresponding time interval of a symbol of a second OFDM numerology with a second SCS that is lower than the first SCS or (b) the excess CP is distributed as prefix and postfix portions to one of the symbols of the set of symbols; and communicate with the base station via the communication interface using the first SCS and the first OFDM numerology.

In another aspect of the disclosure, a method is provided for wireless communication for use by a UE. The method includes: establishing communication with a base station using a first SCS and a first OFDM numerology wherein (a) an excess CP is distributed among a set of symbols that occupy a time interval within or equal to a corresponding time interval of a symbol of a second OFDM numerology with a second SCS that is lower than the first SCS or (b) the excess CP is distributed as prefix and postfix portions to one of the symbols of the set of symbols. The method includes communicating with the base station while using the first OFDM numerology at the first SCS.

DETAILED DESCRIPTION

Figure 1:
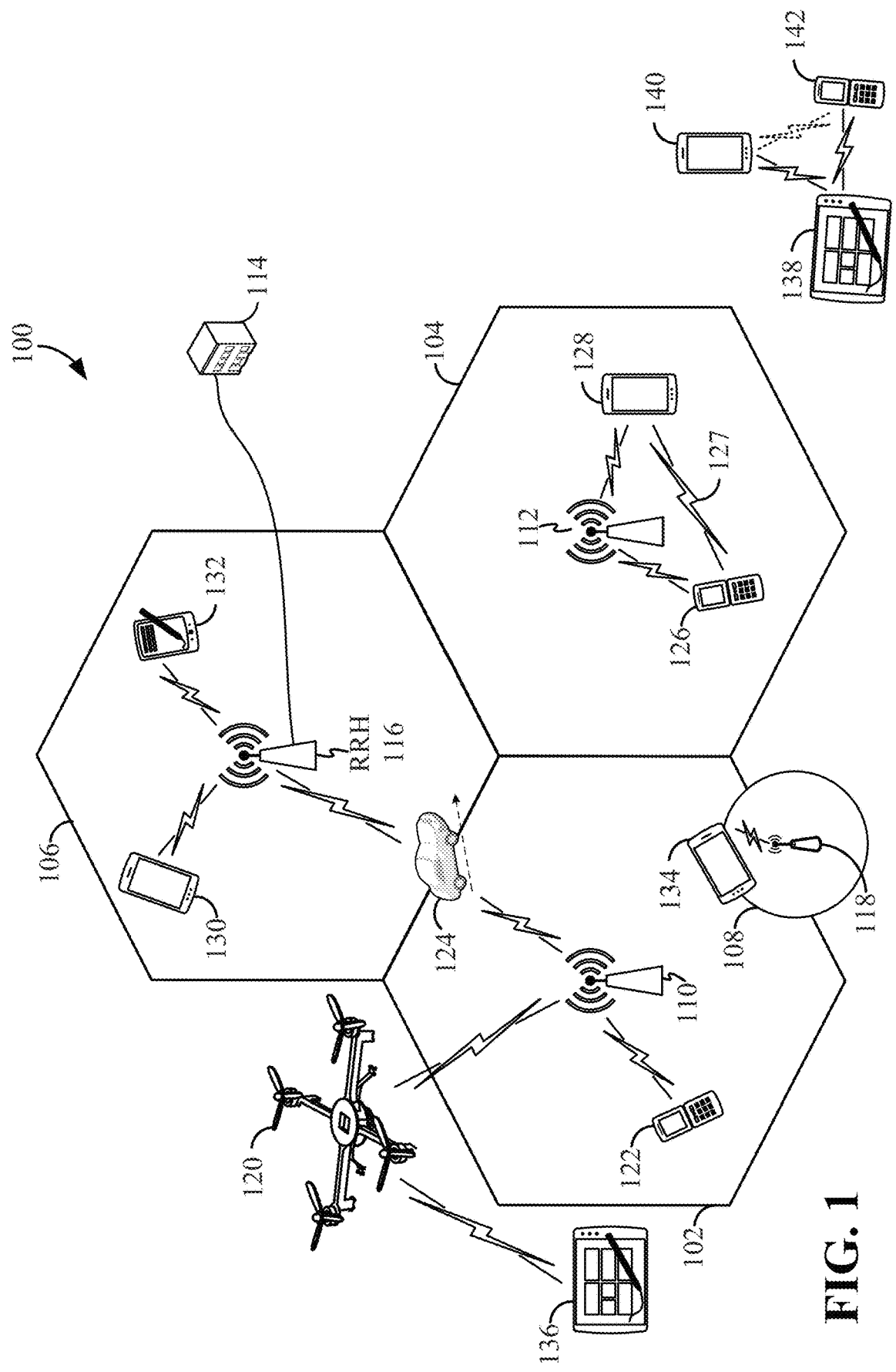
FIG. 1 is a conceptual diagram illustrating an example of a radio access network in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide various apparatus, methods, and systems that provide wireless communication numerologies with symbol alignment. As noted above, in wireless communication systems, a numerology refers to a set of operating parameters deployed in a wireless communication system. For example, numerology may be defined as the set of physical layer parameters of the air interface used to communicate a particular wireless signal. In illustrative examples herein, the wireless communication network is configured in accordance with 3rd Generation Partnership Project (3GPP) New Radio (NR) specifications (often referred to as 5G). Some particular numerologies employed by NR specify orthogonal frequency-division multiplexing (OFDM) operating parameters that define and control how data or information may be transmitted using OFDM radio access technology. Examples of OFDM numerology operating parameters include symbol duration/length, tone/subcarrier spacing, Fast Fourier transform (FFT) size, frequency, frame size, symbols per frame, cyclic prefix (CP) length, or other parameters that define the frame and lattice structure of the waveform. A numerology may be defined as a particular fixed configuration of these parameters. An exemplary type of OFDM is CP-OFDM. Within CP-OFDM, the numerology primarily relates to a combination of sub-carrier spacing (SCS) and CP length. (Note that "numerology" may be alternatively referred to as a set of transmission operating parameters or a configuration of wireless communication operating parameters, or by using other suitable terms.)

In CP-OFDM, the CP may be a copy of a tail portion of a symbol and is placed before the symbol to provide a guard interval to mitigate multipath interference and facilitate demodulation. That is, the CP may consist of the end of an OFDM symbol copied into the interval that precedes the OFDM symbol. Among other features, the CP allows the receiver to integrate over an integer number of sinusoid cycles when it performs OFDM demodulation with an FFT, thus facilitating demodulation. Notably, the CP keeps inter-symbol interference (between OFDM symbols) outside an FFT window to thereby allow for higher signal-to-interference-plus-noise ratio (SINR) levels with acceptable overhead.

In some CP-OFDM numerologies, a first OFDM symbol in every half subframe employs a CP with excess duration (as compared to a nominal CP duration), where the duration (or length) of the excess CP is independent of the particular CP-OFDM numerology. At new higher bands within NR systems that are under development, subcarrier spacings may be higher, and thus OFDM symbol durations may be shorter. Consequently, the duration of the excess CP for the first OFDM symbol may become significant compared to the OFDM symbol duration. Herein, exemplary CP-OFDM numerologies are provided wherein the excess CP duration is distributed among a set of OFDM symbols so that: (1) symbol alignment to other (lower) numerologies is preserved and (2) the resulting CP durations correspond to an integer number of samples at various sampling rates, such as those corresponding to a nominal FFT size as well as with a decimation factor of sixteen. These techniques are applicable, but not limited to, SCSs of 960 kilohertz (kHz), 1920 kHz, and 3840 kHz, while providing alignment to lower SCSs, such as 120 kHz.

One particular exemplary numerology described herein distributes the excess CP duration of a higher SCS evenly among a set of symbols at the beginning of each half subframe, where the set of symbols occupy the same time interval as the first symbol corresponding to a lower subcarrier spacing (e.g. 120 kHz). Another exemplary numerology described herein instead distributes the excess CP of the first symbol of each half subframe as separate prefix and postfix portions applied to the first symbol. Although this latter technique does not reduce the total excess CP corresponding to the first symbol, the presence of the postfix at the end of the first symbol provides for beam switching opportunities, described below.

Before discussing these and other techniques in detail, an overview of a wireless communication system employing OFDM is provided. However, it is noted that the various concepts presented throughout this disclosure may be implemented across a broad variety of telecommunication systems, network architectures, and communication standards. Referring to FIG. 1, as an illustrative example without limitation, a schematic of a radio access network 100 is provided. A geographic region covered by the radio access network 100 may be divided into a number of cellular regions (cells) that can be uniquely identified by a user equipment (UE) within the cell based on an identification broadcasted over a geographical area from one access point or base station.

FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within the cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104 and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as a UE in standards and specifications promulgated by 3GPP, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Any of the base stations may communicate with different UEs by multiplexing different numerologies in the same frames, subframes, half subframes, and/or slots.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, half subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. A half subframe may refer to a duration of 0.5 ms. Multiple subframes may be grouped together to form a single frame or radio frame.

The air interface in the radio access network 100 may utilize one or more multiplexing, multiple access algorithms, and numerologies to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), OFDM access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), OFDM, sparse code multiplexing (SCM), or other suitable multiplexing schemes.

Further, the air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing (frame timing, subframe timing, etc.) from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still needed to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell using one or more numerologies. The scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
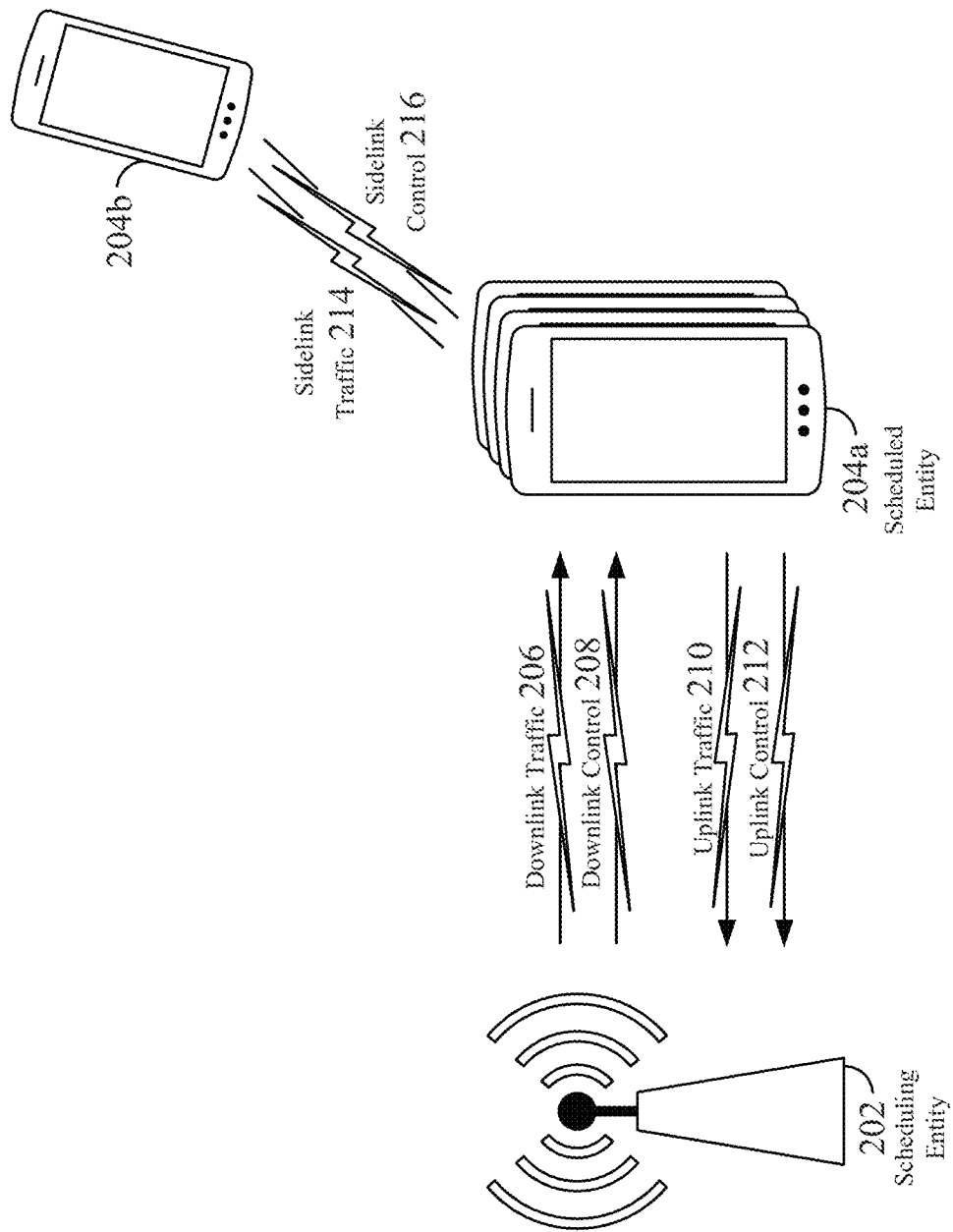
FIG. 2 is a block diagram illustrating an example of a scheduling entity communicating with one or more scheduled entities in accordance with aspects of the disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., UE 204*a* and UE 204*b*). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-topoint transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; an SSS; a physical control format indicator channel (PCFICH); a physical hybrid automatic repeat request (HARQ) indicator channel (PHICH); and/or a physical downlink control channel (PDCCH), etc., to one or more scheduled entities 204. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the transmission time interval (TTI) for uplink packet transmissions.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
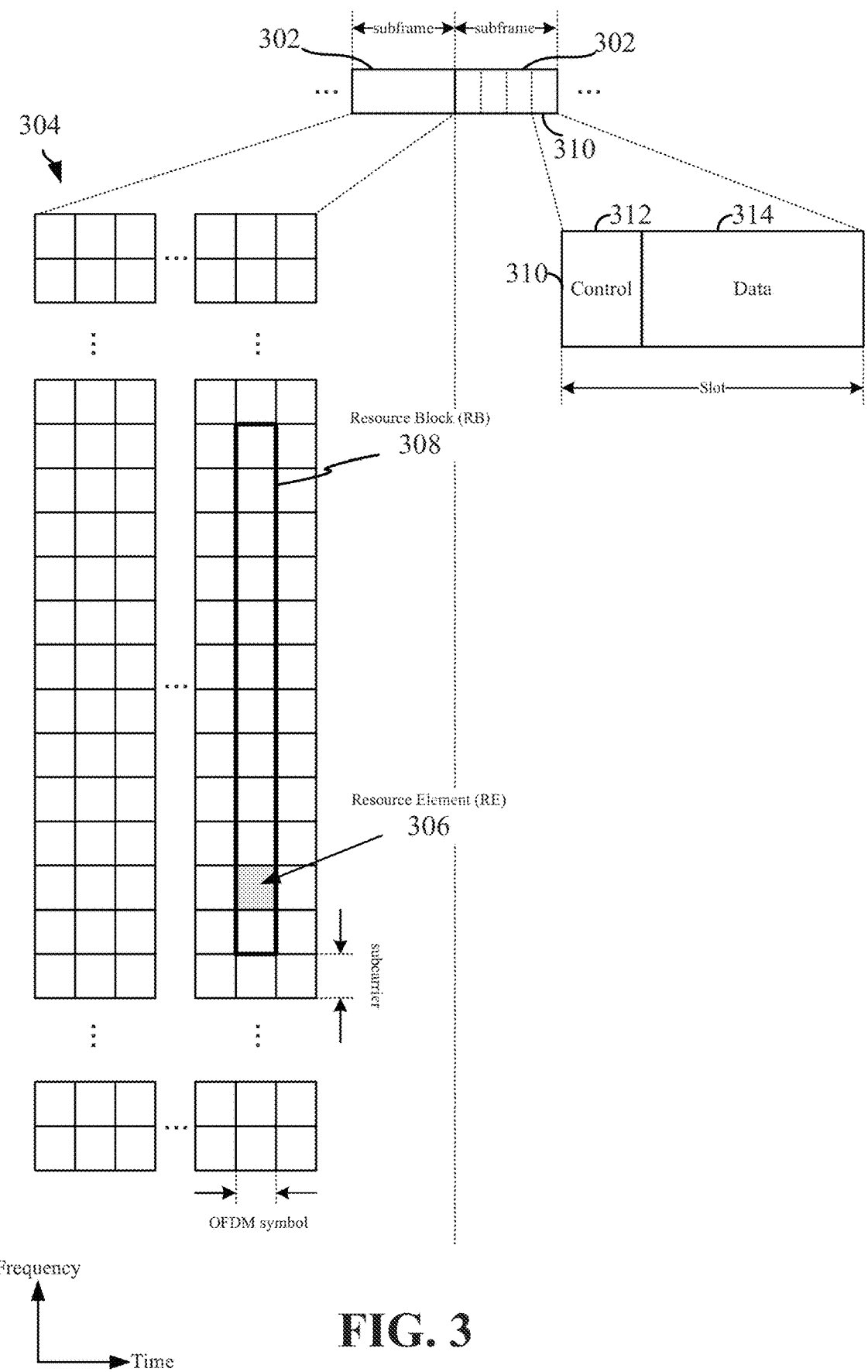
FIG. 3 is a schematic illustration of an organization of time-frequency resources on a carrier utilizing orthogonal frequency division multiplexing (OFDM) in accordance with aspects of the disclosure.

By way of illustration, various aspects of the present disclosure will be described with reference to a CP-OFDM waveform, schematically illustrated in FIG. 3. In FIG. 3, the CP preceding each CP-OFDM symbol is not explicitly shown so as not to obscure other features of the illustration. With FIG. 3, an expanded view of an exemplary DL subframe 302 is illustrated, showing a CP-OFDM resource grid 304. However, as those skilled in the art will readily appreciate, a transmission structure for any particular application may vary from the example described here, depending on any number of factors. Here, time is in the horizontal direction with units of CP-OFDM symbols; and frequency is in the vertical direction with units of subcarriers.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include twelve subcarriers, a number independent of the numerology used. In some examples, depending on the numerology, an RB may include any suitable number of consecutive CP-OFDM symbols in the time domain Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration of FIG. 3, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of CP-OFDM symbols, each with a given CP length. For example, a slot may include 7 or 14 OFDM symbols with a nominal CP (or with some symbols including an extended CP). Additional examples may include mini-slots having a shorter duration (e.g., one or two CP-OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). In various examples, a slot 310 may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although the illustration of the slot 310 in FIG. 3 shows both the control and data regions 312 and 314, respectively, appearing to occupy the entire bandwidth of the slot 310, this is not necessarily the case. For example, a DL control region 312 may occupy only a portion of the system bandwidth. In some aspects of the present disclosure, the DL control region 312 may be a downlink common burst or a common control region. In this example, a common control region may be common, in that its bandwidth and location within the system bandwidth for that slot may be predetermined, or known to various devices in the RAN 100.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

According to some aspects of a DL transmission, the transmitting device (e.g., scheduling entity 202) may allocate one or more REs 306 (e.g., within a control region 312) to carry DL control information 314 including one or more DL control channels, such as PCFICH; PHICH; and/or PDCCH, etc., to one or more scheduled entities 204.

In an UL transmission, the transmitting device (e.g., the scheduled entity 204) may utilize one or more REs 306 to carry UL control information 312 including one or more UL control channels, such as a physical uplink control channel (PUCCH), to the scheduling entity 202. UL control information may include a variety of packet types and categories, including pilots, reference signals, and information configured to enable or assist in decoding uplink data transmissions. In some examples, the UL control information 312 may include a scheduling request (SR), i.e., request for the scheduling entity 202 to schedule uplink transmissions. Here, in response to the SR transmitted on the UL control channel 312, the scheduling entity 202 may transmit DL control information 312 that may schedule resources for UL packet transmissions. UL control information 312 may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, PDSCH; or for an UL transmission, PUSCH. In some examples, one or more REs 306 within the data region 314 may be configured to carry system information blocks (SIBs), carrying information that may enable access to a given carrier.

The channels or carriers described above and illustrated in the figures are not necessarily all the channels or carriers that may be utilized between a scheduling entity and scheduled entities, and those of ordinary skill in the art will recognize that other channels or carriers may be utilized in addition to those illustrated, such as other traffic, control, and feedback channels.

Further information regarding physical channels and modulation may be found in 3GPP TS 38.211, Version 15.2.0, Release 15, Physical Channels and Modulation.

In a CP-OFDM carrier, to maintain orthogonality of the subcarriers or tones, the subcarrier spacing may be equal to the inverse of the symbol period. As noted, numerology of a CP-OFDM waveform refers to its particular subcarrier spacing and CP overhead. A scalable numerology refers to the capability of the network to select different subcarrier spacings, and accordingly, with each spacing, to select the corresponding symbol duration, including the CP length. With a scalable numerology, a nominal SCS may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 3840 kHz.

Figure 4:
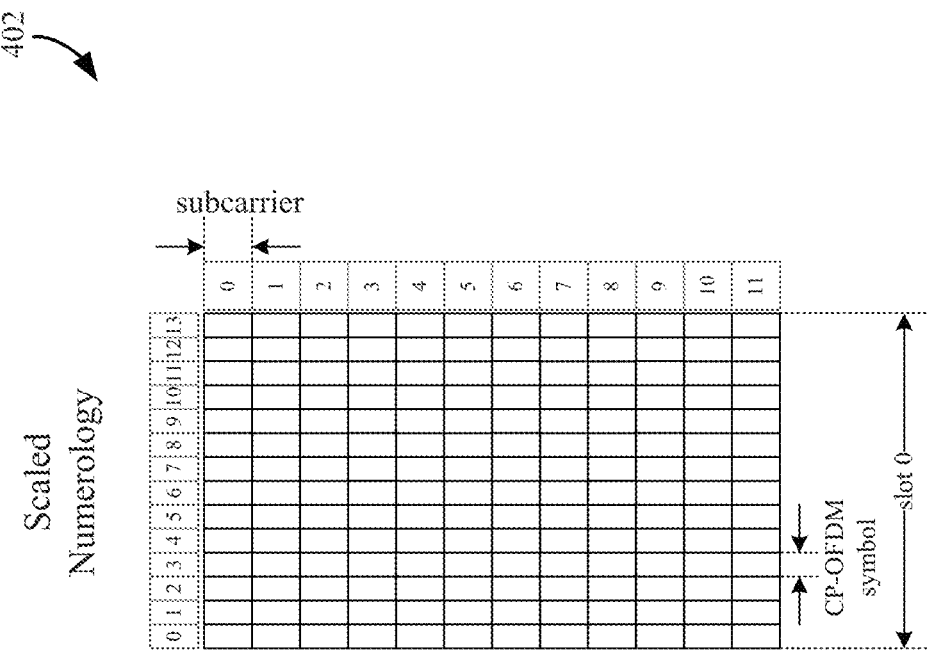
FIG. 4 is a diagram illustrating some examples of scaled numerology in wireless communication in accordance with aspects of the disclosure.
Figure 4:
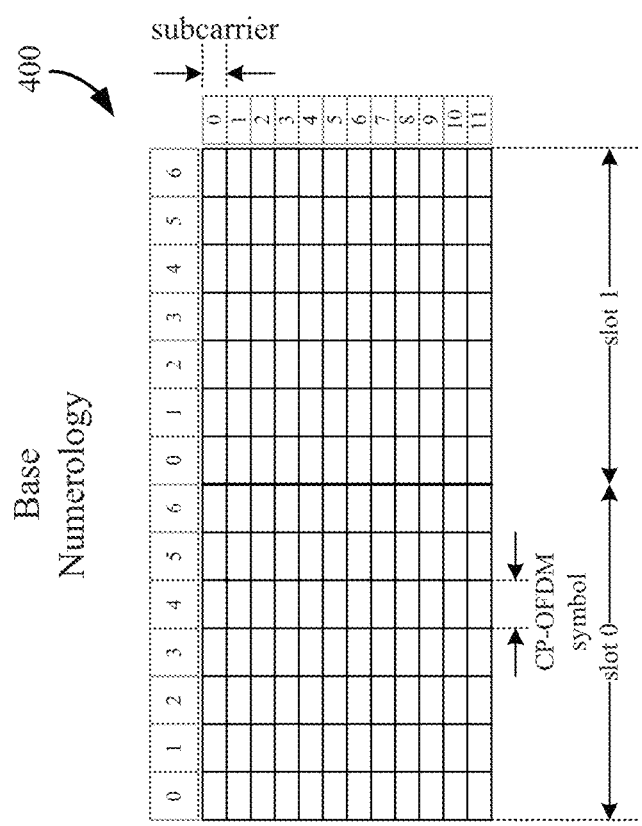

As the illustrative examples herein may employ scaling to accommodate different numerologies having different SCSs, FIG. 4 is provided to illustrate different numerologies via two-dimensional grids of CP-OFDM REs of the numerologies. (The CP portion of the CP-OFDM symbol is not shown so as not to obscure other aspects of the figure.) The REs may be arranged by separation of resources in frequency by defining a set of closely spaced frequency tones or subcarriers and by separation in time by defining a sequence of symbols having a given duration.

In FIG. 4, each square box represents one RE corresponding to a CP-OFDM symbol and a subcarrier. In CP-OFDM, to maintain orthogonality of the subcarriers or tones, the subcarrier spacing is equal to the inverse of the symbol period. A scalable numerology refers to the capability of the network to select different subcarrier spacings and/or symbol periods, and accordingly, with each spacing, to select the corresponding symbol period. In general, the symbol period should be short enough that the channel does not significantly vary over each period, in order to preserve orthogonality and limit inter-subcarrier interference. On the other hand, the symbol period should not be too short. For example, in multipath environments there may be significant signal loss due to intersymbol interference from excessive delay spread.

A base numerology resource grid 400 is illustrated on the left side of FIG. 4. Each slot (e.g., slot 0 and slot 1) of the base numerology resource grid 400 has seven symbols (symbols 0 to 6). Note that the exemplary numerology of FIG. 4 is a long term evolution (LTE) numerology. In NR, slots have fourteen symbols. Twelve subcarriers (subcarriers 0 to 11) are available for transmitting symbols. A scaled numerology resource grid 402 is illustrated on the right side of the FIG. 4. (The resource grids 400 and 402 are not drawn to the same scale for ease of illustration.) For example, slot 0 of both resource grids represents a same duration of time. Slot 1 of the scaled numerology resource grid 402 is similar to slot 0 but is not shown in FIG. 4. In this example, a slot includes 7 symbols for the base numerology and 14 symbols for the scaled numerology. The tone spacing (e.g. SCS) of the scaled numerology is twice that of the base numerology. In some examples, the subcarriers of the base numerology may be different from those of the scaled numerology. In some examples, some subcarriers may be supported by both the base numerology and scaled numerology.

Figure 5:
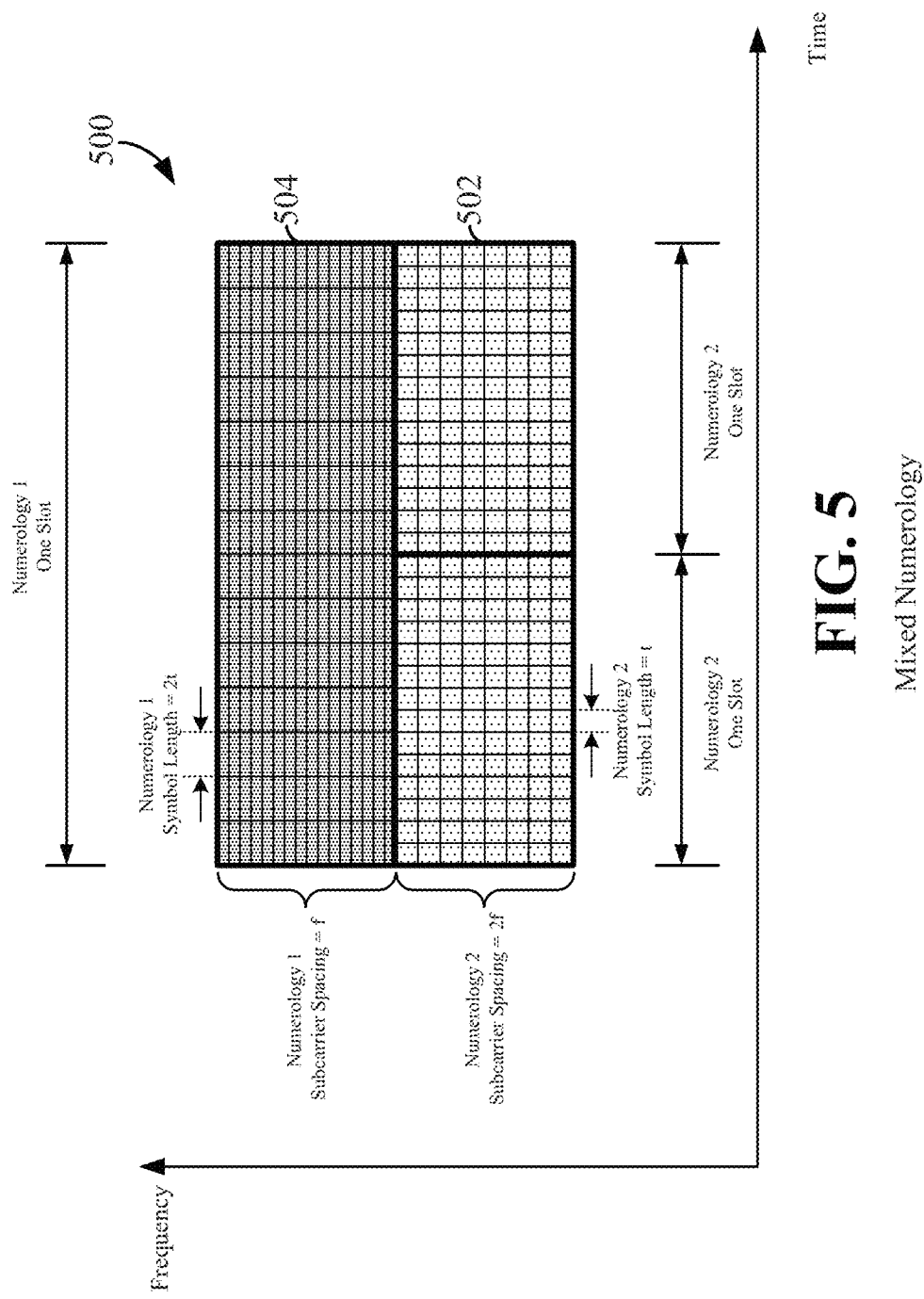
FIG. 5 is a schematic illustration of time-frequency resources on a carrier utilizing OFDM with a mixed numerology in accordance with aspects of the disclosure.

As the illustrative examples herein may additionally employ some form of mixed numerologies, FIG. 5 is provided to illustrate mixed numerology.

FIG. 5 is a schematic illustration of a mixed-numerology carrier 500, multiplexing CP-OFDM waveforms of two different numerologies utilizing FDM. (Again, the CP portion of each CP-OFDM symbol is not explicitly shown so as to not obscure other features in the illustration.) In this example, a first subband 502 may have a first SCS of 2f, and a symbol duration of t. Further, a second subband 504 may have an SCS of half that of the first subband 502, or 2f/2=f. In one non-limiting example, the SCS f of the first numerology may be 30 kHz, and the subcarrier spacing 2f of the second numerology may be 60 kHz. As discussed above, because the SCS is reduced in the second subband 504, the symbol duration in that subband 504 is correspondingly increased. Thus, in the second subband 504, the numerology includes a symbol duration of twice that of the first subband 502, or 2t.

In various examples, different UEs 122 may utilize different CPs (such as a normal CP and an extended CP having excess CP values), generally under the control of the scheduling entity. Because the CP is part of the OFDM symbol, within the present disclosure, any reference to a different numerology may refer to communication with different tone spacings and corresponding different symbol lengths, encompassing potentially different CPs within the different symbol lengths.

As illustrated in FIG. 5, even within the same slot, and on the same carrier, different UEs may be assigned REs having different numerologies when the different numerologies are frequency division multiplexed with one another. Thus, transmission on the DL from a scheduling entity may be a mix or multiplexing of these different waveforms, constituting the mixed-numerology carrier 500.

By supporting multiple numerologies, a RAN can support multiple mixed-use cases, e.g., for different types of UEs, UEs with different requirements, UEs running different services, etc. As one example, a UE utilizing a service that requires very low latency may better achieve that goal with a shorter slot length. Accordingly, that UE may be allocated resources in a numerology that has shorter symbol durations. In another example, a mixed-numerology carrier may provide for traffic offloading from a given set of resources. That is, when resources corresponding to a first numerology become highly or fully occupied, then a scheduling entity may be enabled to redirect one or more scheduled entities to utilize resources of a second numerology. In another example, a scheduling entity may redirect scheduled entities for load balancing, e.g., to better balance traffic in different portions of the mixed-numerology carrier. Thus, a scheduling entity may be enabled to redirect a subset of UEs camped on that cell onto a second numerology, while maintaining communication with another subset of one or more UEs using the first numerology. When a carrier supports multiple numerologies, each numerology may provide a control channel, corresponding to data and traffic channels that utilize that numerology. However, this need not always be the case. In some examples, where a UE is capable of utilizing resources with different numerologies, a common control channel may be utilized for each of a plurality of numerologies.

Figure 6:
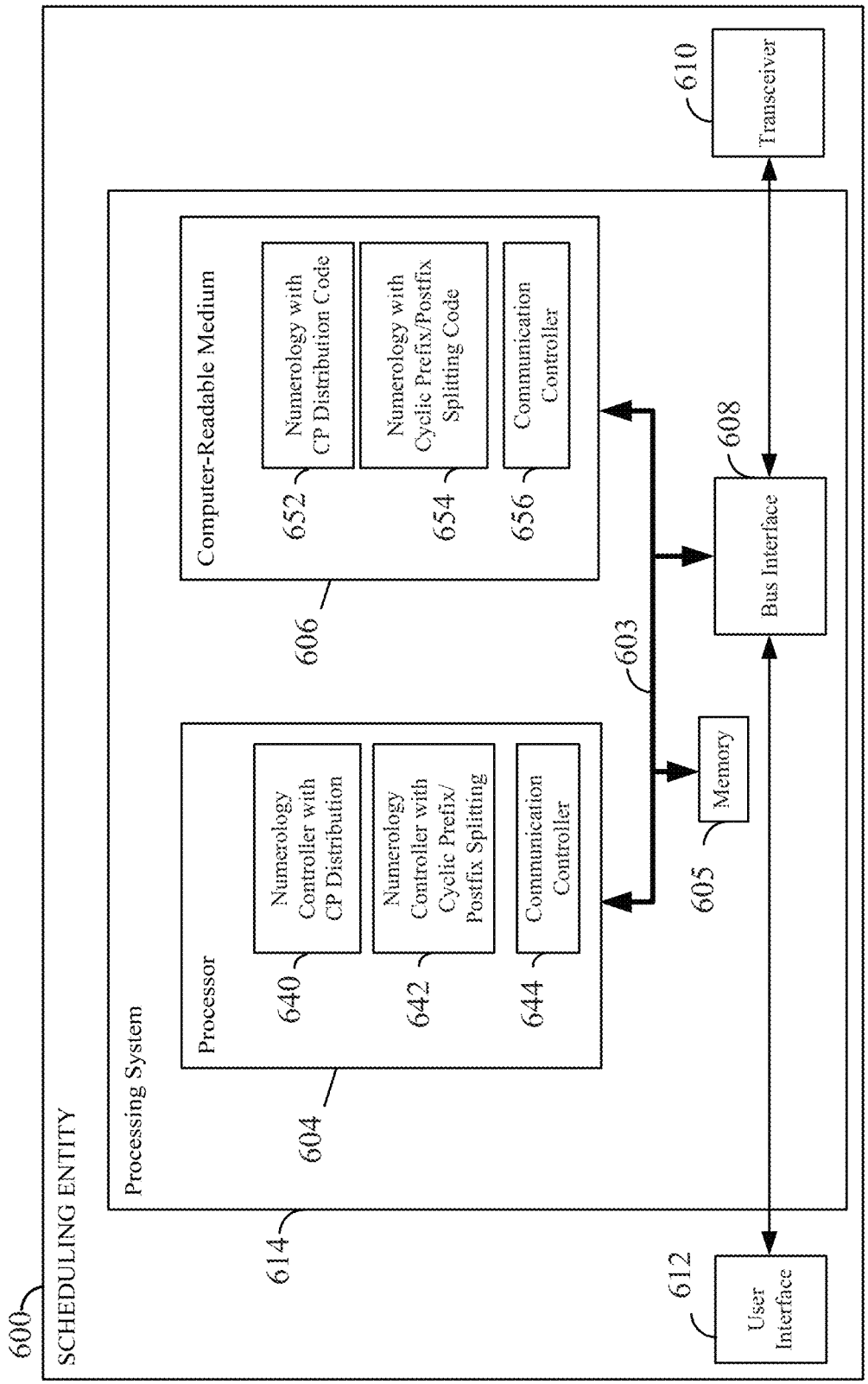
FIG. 6 is a block diagram illustrating an example of a hardware implementation for a scheduling entity (such as a gNB) in accordance with aspects of the disclosure.

FIG. 6 is a block diagram illustrating an example of a hardware implementation for a scheduling entity 600 employing a processing system 614 capable of processing and communicating using numerologies that distribute an excess CP evenly among a set of symbols at the beginning of each half subframe and/or numerologies that distribute the excess CP as a prefix and postfix to a first symbol of a half subframe.

In one example, the scheduling entity 600 of FIG. 6 may be a base station as illustrated in any one or more of the other figures (although it may also be a UE).

The scheduling entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions described herein. That is, the processor 604, as utilized in a scheduling entity 600, may be used to implement any one or more of the processes and procedures described elsewhere herein.

In the example of FIG. 6, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium. Depending upon the nature of the apparatus, a user interface 612 (e.g., keypad, display, speaker, microphone, joystick) may also be provided.

In some aspects of the disclosure, the processor 604 may include circuitry configured to implement one or more of the functions described elsewhere herein. The processor 604 may include a Numerology Controller with CP Distribution 640 configured to process, select or control a numerology wherein excess portions of a first CP of a half subframe are distributed evenly among a subset of the set of OFDM symbols of the half subframe while symbol alignment is maintained to other numerologies and integer number of samples are produced for each CP for various nominal sampling rates (such as corresponding to a nominal FFT size and decimated versions of it by, e.g., $\frac{1}{16}$). As will be explained below, the manner by which the numerology distributes the excess CP evenly among the set of OFDM symbols may depend both on the SCS and the decimation rate. Exemplary SCSs are 960 kHz, 1920 k Hz, and 3840 kHz, and an exemplary FFT decimation factor (of a 4K FFT) is sixteen. Note that CPs that include excess CP values may be referred to as extended CPs; whereas CPs that do not include excess CP values may be referred to as nominal CPs. The extended CP includes a nominal CP portion and an excess CP portion.

The processor 604 may also include a Numerology Controller with Cyclic Prefix/Postfix Splitting 642 configured to process, select or control a numerology wherein the numerology distributes the excess CP as prefix and postfix portions to the first symbol of the half subframe while symbol alignment is maintained to other numerologies at nominal sampling rates (such as corresponding to a nominal FFT size or decimated versions). Again, exemplary SCSs are 960 kHz, 1920 k Hz, and 3840 kHz, and an exemplary FFT decimation factor is sixteen.

A communication controller 644 is also provided for communicating signals to a UE or other scheduled entity in accordance with one or more selected numerologies such as by multiplexing different numerologies (e.g., a higher numerology with a lower numerology).

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The computer-readable storage medium 606 may include software configured to implement one or more of the functions described elsewhere herein. For example, the computer-readable storage medium 606 may include numerology with CP distribution code 652, numerology with cyclic prefix/postfix splitting code 654, and communication code 656, which may be configured with instructions, which when executed by the processor 604, causes the processor to perform the functions noted above for processor components 640, 642, and 644.

Figure 7:
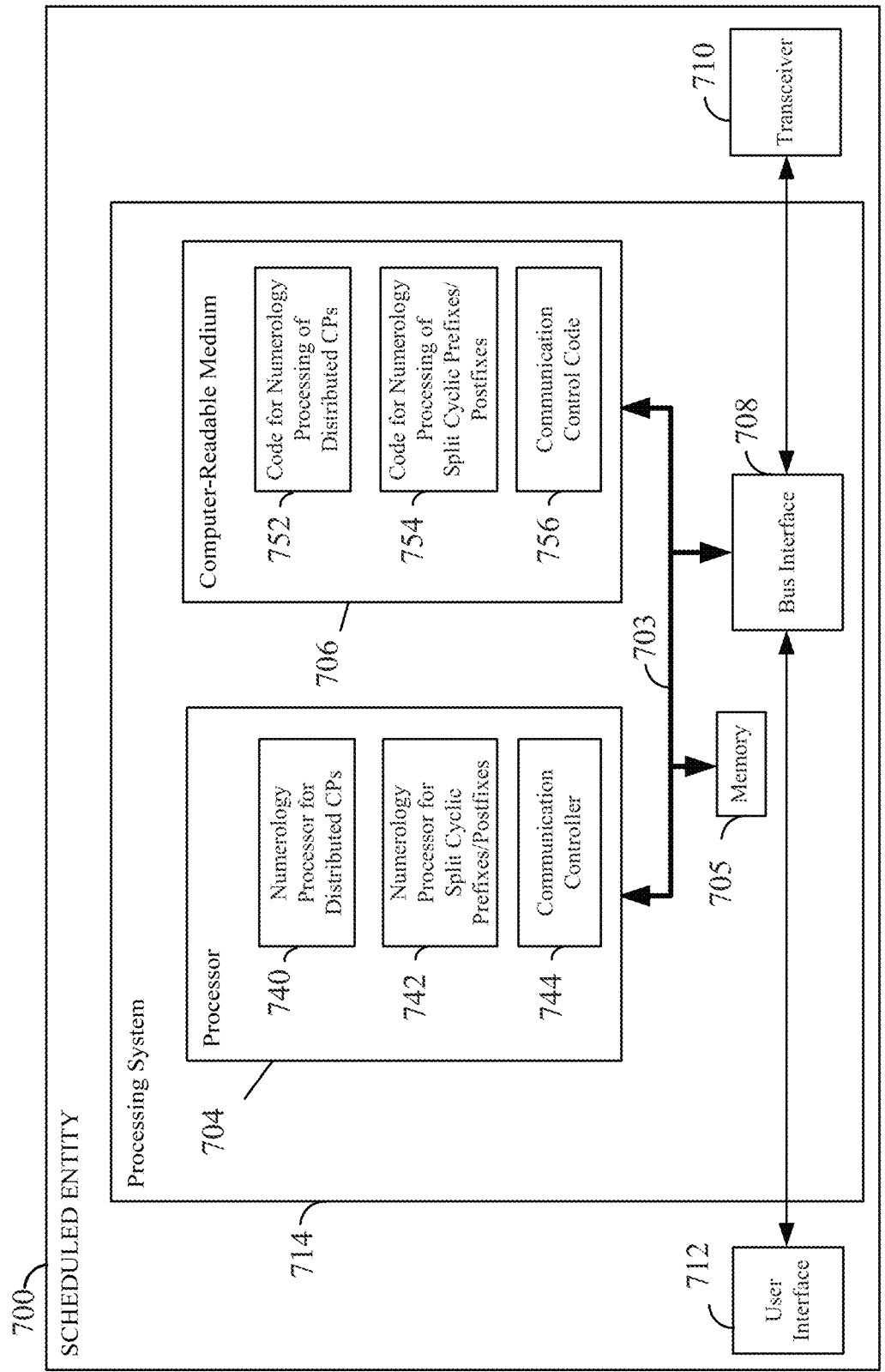
FIG. 7 is a block diagram illustrating an example of a hardware implementation for a scheduled entity, such as a user equipment (UE) in accordance with aspects of the disclosure.

FIG. 7 is a block diagram illustrating an example of a hardware implementation for an exemplary scheduled entity 700 employing a processing system 714, which may be, for example, a UE. In accordance with various aspects of the disclosure, an element, or any portion of an element, or any combination of elements may be implemented with a processing system 714 that includes one or more processors 704. For example, the scheduled entity 700 may be a UE as illustrated in any one or more of the other figures.

The processing system 714 may be generally similar to the processing system 614 illustrated in FIG. 6, including a bus interface 708, a bus 702, memory 705, a processor 704, a computer-readable medium 706, a user interface 712, and a transceiver 710 (a communication interface) similar to those described above, and so many of the details of the system architecture will not be described again.

The processor 704, as utilized in a scheduled entity 700, may be used to implement one or more of the various processes described herein for use by scheduled entities, such as UEs. In some aspects of the disclosure, the processor 704 includes Numerology Processor that corresponds to the numerology processing components of the scheduling entity of FIG. 6 but configured to process signals sent by the scheduling entity of FIG. 6 in accordance with the particular numerology selected by the scheduling entity. For example, the processor 704 may include a Numerology Processor for Distributed CPs component 740 configured to decode or otherwise process received signals in accordance with a numerology that distributes excess CP evenly among an initial subset of the set of OFDM symbols of the half subframe. As noted above, the particular numerology may, for example, employ SCSs of 960 kHz, 1920 k Hz, and 3840 kHz, and an FFT decimation factor of sixteen may be employed (for a 4K FFT).

The processor 704 may also include a Numerology Processor for Split Cyclic Prefixes/Postfixes component 740 configured to decode or otherwise process signals received in accordance with a numerology that distributes an excess CP as prefix and postfix portions to the first symbol. A communication controller 744 is provided for communicating signals to the scheduling entity.

The computer-readable storage medium 706 may include software configured to implement one or more of the functions described elsewhere herein. For example, the computer-readable storage medium 706 may include code for Numerology Processing of Distributed CPs 752, code for Numerology Processing of Split Cyclic Prefixes/Postfixes 754, and communication control code 756, which may be configured with instructions, which when executed by the processor 704, causes the processor to perform the functions noted above for processor components 740, 742, and 744.

Figure 8:
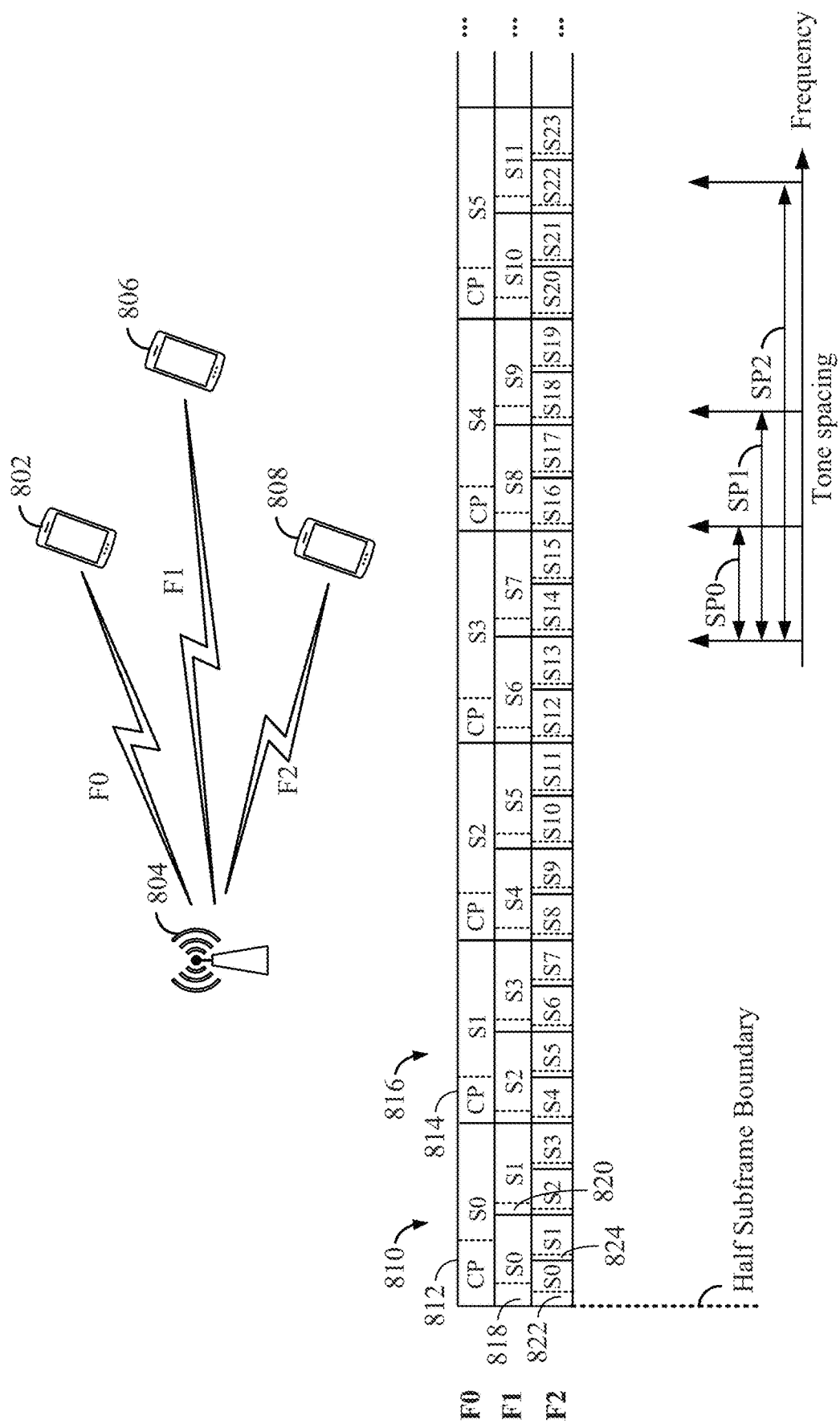
FIG. 8 is a diagram illustrating an example of multiplexing of different OFDM numerologies wherein a first OFDM symbol at a first sub-carrier spacing (SCS) has an extended cyclic prefix (CP) in accordance with aspects of the disclosure.

FIG. 8 is a diagram illustrating some examples of scaled numerologies wherein a CP of a first symbol of a half subframe is longer than other (nominal) CPs of the other symbols. Within the exemplary numerologies, the first symbol of each half subframe (and only that symbol) is an extended CP. All other CPs of the half subframe are nominal CPs. (FIG. 8, as with other the figures, are not necessarily to scale.) One reason the first symbol may be provided with excess CP, at least in some examples, is to reduce transmitter/receiver complexity by ensuring that after sampling the signal at a natural sampling rate, the various CPs and symbols of the half subframe yield an integer number of samples and hence can be processed efficiently using digital components. For instance, in some examples, it is desirable for the samples of the half subframe (obtained at the natural sampling rate) to be exactly divisible by some particular predetermined integer so as to facilitate digital processing. (In some long term evolution (LTE) examples, excess CP may be added to the first CP of a seven symbol slot so that the duration of the entire slot in time units is divisible by 15,360.)

Herein, extended CPs that are provided only at the beginning of a half subframe of a CP-OFDM numerology (when all other CPs in the subframe are nominal CPs) may be referred to as a "first symbol only extended CP," a "subframe length adjustment CP," a "subframe length normalization CP," a "subframe length conformance CP" or other words to that effect.

Three numerologies are illustrated in FIG. 8. A first UE 802 may communicate with a base station 804 using a base numerology (F0), a second UE 806 may communicate with the base station 804 using a first scaled numerology (F1), and a third UE 808 may communicate with the base station 804 using a second scaled numerology (F2). In some examples, the same UE may use different numerologies to communicate with the same base station or different base stations.

In one example, the base numerology employs slots or subframes that each has a predetermined number of symbols, with CPs preceding each symbol. The first symbol (S0) 810 of F0 has a CP 812 that is longer (e.g., contains more samples) than the nominal CP 814 of the second symbol (S1) 816. The CPs of the other symbols of F0 (S2, S3, . . . ) have the same length as CP 814. The symbols S0, S1, S2, etc., within a sequence of symbols (such as F0) are each the same length. Note that, since the first CP 812 is an extended CP, then the "first CP+first symbol" has a longer duration than the "second CP+second symbol." To accommodate different durations of CP+ symbol, there can be differing amounts of time between symbol boundaries. The time interval between symbol boundaries and CP boundaries are not shown to scale in FIG. 8 or in the other figures herein (such as FIGS. 9 and 10). As such, it might appear in the figure that the symbols of a particular sequence (such as F0) are of different lengths. As noted, though, the symbols are the same length.

As shown in FIG. 8, the base numerology (F0) may be scaled to provide, for example, the first scaled numerology (F1) and the second scaled numerology (F2) with different SCS. To maintain orthogonality of the OFDM subcarriers or tones, the SCS is equal to the inverse of the symbol period. Herein, a scalable numerology refers to the capability of the network to select different subcarrier spacings, and accordingly, with each spacing, to select the corresponding symbol period.

In the example of FIG. 8, the base numerology F0 has a smaller subcarrier spacing SP0 than the subcarrier spacing SP1 of the first scaled numerology and the subcarrier spacing SP2 of the second scaled numerology. A first time period of the base numerology (F0) contains one symbol S0, whereas the same time period of numerology (F1) contains two symbols (scaled by 2), and the second numerology (F2) contains four symbols (scaled by 4). Note that this scaling is performed per symbol length (including CPs), not per slot, such that the symbol boundaries of the base numerology are aligned with those of scaled numerologies. In other words, a symbol boundary of the base numerology aligns with a boundary of a symbol of one or more scaled numerologies.

In a comparative example, symbol boundaries between different numerologies might not be aligned. In such a case, when a base station schedules low latency traffic for a certain UE using a certain numerology, and if the previous or ongoing symbol is of a different numerology, then the low latency traffic may need to wait for another symbol to be scheduled, thus adding extra delay. In such a case, a symbol may need to be left blank. In another non-alignment example, if the symbol boundary of numerology (F1) is not aligned with numerology (F0), and if a first symbol (S0) of F0 is longer than the first two symbols (S0+S1) of the numerology (F1), then at the start of the third symbol (S2) of F1, the scheduling entity could not start to schedule the S2 of F1 because it would need to wait until the end of the S0 of F0. Therefore, it can be seen that without symbol alignment, scheduling of data from different multiplexed numerologies can be inefficient and may introduce extra latency due to the mismatch of symbol boundary.

As also shown in FIG. 8, within numerology F1, the CP 818 of the first symbol (S0) is again longer than CP 820 of the second symbol (S1) and all the other nominal CPs of the other symbols (S2, S3, . . . ) of F1. Within numerology F2, the CP 822 of the first symbol (S0) is again longer than the CP 824 of the second symbol (S1) and all the other nominal CPs of the other symbols (S2, S3, . . . ) of F2.

As the SCS of numerologies increase, e.g. from F0 to F1 to F2, the excess CP becomes proportionally larger compared to the OFDM symbol. For numerologies with relatively low SCSs, this may not be an issue, but for higher numerologies (with SCSs of, for example, 960 kHz, 1920 kHz, or 3840 kHz), the excess CP can be better utilized. In one particular example, where the numerology employs frames, subframes and half subframes and an SCS of 960 KHz, the duration in nanoseconds of the extended CP 822 may be about 594 ns, whereas the duration of the nominal CPs, such as CP 824, may be about 73 ns. For an SCS of 3480 KHz, the duration in nanoseconds of the extended CP 822 may be about 540 ns, whereas the duration of the nominal CPs, such as CP 824, may be about 18 ns. As such, at these higher numerologies, the difference in duration between the nominal CPs and the extended CP of the first symbols can be quite significant.

Numerology designs are presented herein where, as noted above and as will now be described in greater detail, the excess CP (that would otherwise be provided only before the first symbol of a half subframe) is instead distributed evenly among a selected number of other symbols in a manner designed to still provide symbol alignment among different numerologies such that all CP durations are integer number of samples in length at various sampling rates corresponding to nominal and decimated, such as 1/16, FFT sizes. In other examples, the numerology distributes the excess CP (that would otherwise be provided only before the first symbol of the half subframe) into prefix and postfix portions of the first symbol, again in a manner designed to provide symbol alignment among different numerologies as well as integer number of samples for all CPs at various sampling rates. The symbol-boundary alignment enables symbol-level numerology multiplexing for different UEs or scheduled entities in frequency and/or time.

Figure 9:
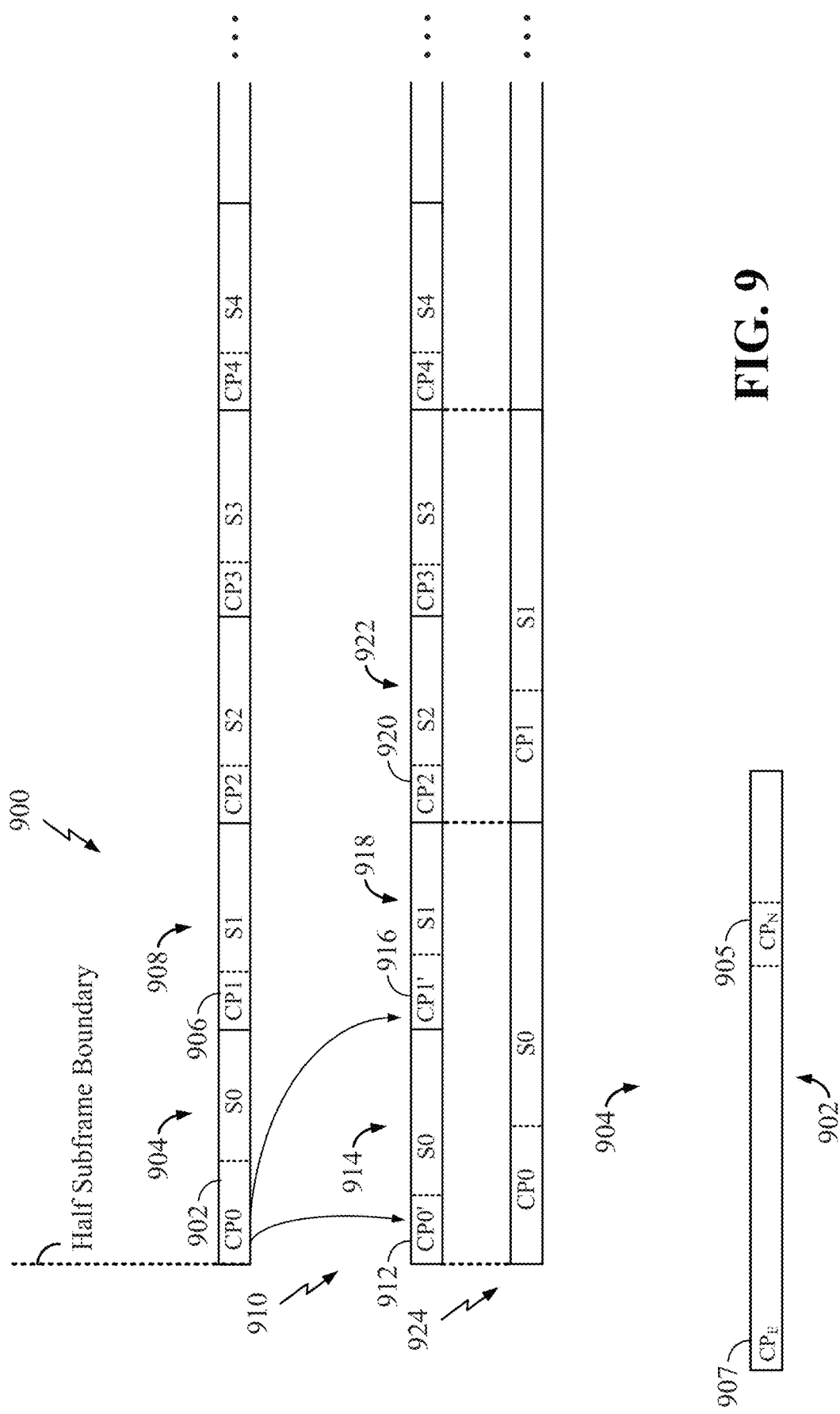
FIG. 9 is a diagram illustrating an example of multiplexing of different OFDM numerologies wherein an excess CP portion of the extended CP of the first OFDM symbol is evenly distributed among a set of other OFDM symbols in a half subframe in accordance with aspects of the disclosure.

FIG. 9 illustrates an exemplary numerology in which excess CP (that would otherwise be provided only before the first symbol of the half subframe) is distributed evenly among other symbols at the beginning of the subframe. For comparison purposes, FIG. 9 also illustrates a numerology similar to that of FIG. 8 in which the excess CP is provided only within the first symbol.

A first sequence 900 of symbols is illustrated in accordance with a numerology wherein, as in FIG. 8, a CP (CP0) 902 of a first symbol 904 (S0) is longer than the nominal CPs of the other symbols, such as CP1 906 of a second symbol 908 (S1). Note that CP 902 of the first CP (CP0) includes both a nominal CP portion (or duration) $CP_N$ 905 and an excess CP portion (or duration) $CP_E$ 907. The other CPs of the sequence 900 include only a nominal CP portion (or duration). In an example with an SCS of 960 KHz, the nominal CP portion ($CP_N$) 905 may be about 73 ns, the excess CP portion ($CP_E$) 907 may be about 521 ns, and the entire extended CP 902 may be about 594 ns. The symbols S0, S1, S2, etc., are each the same length. Note that the drawings within FIG. 9 are not to scale. As explained with reference to FIG. 8, to accommodate different durations of a CP+a symbol, there can be differing amounts of time between symbol boundaries. Such time intervals are not shown to scale in FIG. 9.

A second sequence 910 of symbols in accordance with a different updated numerology is also illustrated wherein the numerology distributes (or allocates) the excess CP (CP0) 902 of the first symbol 904 (S0) evenly among a first CP (CP0') 912 of a first symbol S0 914 and a second CP (CP1') 916 of a second symbol S1 918. The third CP (CP2) 920 of a third symbol S2 922 is unchanged. Arrows are provided to conceptually illustrate that the excess CP0 duration of sequence 900 of the first numerology is evenly distributed or allocated among the first two symbols of sequence 910 within the updated numerology. Primes are added to CPs 912 and 916 to indicate that these particularly CPs differ from the corresponding CPs 902 and 906 of sequence 900. CP0' 912 is shorter than CP0 902. CP1' 916 is longer than CP1 906.

A third sequence 924 of symbols is also illustrated that has a lower SCS, wherein one CP-OFDM symbol of lower sequence 924 is equal in duration to two of the CP-OFDM symbols of higher sequence 910. As shown, the excess portions of the CPs (e.g. CP0' and CP1') of the second sequence 910 are distributed evenly so that symbol alignment is maintained with the symbol boundaries of the sequence 924.

In an example with an SCS of 960 KHz, where the nominal CP portion ($CP_N$) is about 73 ns, and where the excess CP portion of 521 ns is evenly distributed among the first four symbols, the extended CPs of those first four symbols may be about 203 ns. That is, as compared to the numerology of sequence 900, the numerology of sequence 910 provides for a first CP (CP0') that is much shorter than the corresponding first CP of sequence 900, while making the CP of the second symbol longer than the corresponding CP of sequence 900. In other examples, the excess CP of the first symbol may be evenly distributed over four, eight, sixteen, etc., symbols.

Herein, by providing a numerology in which an excess CP of a first symbol (e.g. a "subframe length adjustment CP" of the type discussed above) is distributed among a set of symbols, it is meant that the numerology is specified, configured or designed so as to allocate the excess CP (that would otherwise be applied only to the first symbol in other numerologies) among the set of symbols as extended CPs. The actual cyclic prefix values for use in each of the extended CPs of the updated numerology may be generated using otherwise standard CP generator techniques to fill the allocated CP durations of the numerology. (Thus, the specific bits that would otherwise be encoded within the excess CP of a first symbol of numerology sequence 900 are not shifted into the extended CPs of numerology sequence of CPs 912. Rather, each extended CP in the updated numerology may comprise, for example, a copy of the tail portion of the particular symbol it will precede, or may be constructed using other suitable techniques.)

Turning now to the particular example wherein the higher numerology has an SCS of 960 kHz, it is helpful to select CP lengths to ensure the following considerations are met: (a) at a natural sampling rate, CP durations for all symbols result in an integer number of samples; (b) at significantly reduced sampling rates, in the form of one over an integer power of two, such as 1/16 of the natural sampling rate, the requirement of integer number of samples for all CP durations is still met to ensure a simple transmitter/receiver implementation for smaller bandwidths or bandwidth parts; (c) all symbol boundaries corresponding to SCS of 120 kHz (thus, for all SCS values lower than 120 kHz) are aligned to symbol boundaries of the 960 kHz numerology. The excess CP durations may be distributed among multiple symbols in accordance with these considerations. By providing symbol alignment between 120 kHz and 960 kHz SCS, mixed numerology is allowed within a slot (where a few symbols are for 120 kHz and a few symbols are for 960 kHz). Moreover, for inter-band carrier aggregation (CA), the symbol alignment allows for cross-carrier assignment timeline to be more precise)

When the higher numerology has an SCS of 960 kHz and the lower numerology has as SCS of 120 kHz, the following exemplary parameters are applicable. The natural sampling period (assuming a 4096-FFT) is equal to 0.5 Tc, where Tc is defined in the aforementioned 3GPP standards document and where, Tc=1/(4096×480000) seconds. The nominal CP length is computed by reducing the nominal CP length of a lower numerology by that power of two corresponding to the ratio of 960 kHz and the SCS of that lower numerology (and is 288 samples in units of the sample period noted above). The total excess CP to be distributed among one or more symbols may be 2048 samples per half subframe. Since there are eight times as many symbols per half subframe for an SCS of 960 kHz compared to an SCS of 120 kHz, it is desirable to distribute the excess CP among the first eight or fewer symbols, such as 1, 2, 4, or 8 symbols, of every half subframe to ensure symbol alignment between SCS values of 120 kHz and 960 kHz.

TABLE I, below, provides valid selections for various specific numerologies for distribution of the excess CP for SCS of 960 kHz. Note that the numerologies of TABLE I (and the various other numerologies in the other tables discussed below) result in an integer number of samples even after decimation by sixteen and provide for symbol alignment to all symbols corresponding to SCS of 120 kHz. For the case of 120 kHz and 960 kHz, one symbol of the 120 kHz numerology aligns with eights symbols of the 960 kHz numerology. Insofar as symbol alignment is concerned, the excess CP can be placed anywhere among the first eight symbols (following the half subframe boundary) of a 960 kHz numerology while maintaining symbol alignment with 120 kHz symbols. Hence, for example, the excess CP might be placed only before the first symbol (as shown, e.g., in sequence 900 if FIG. 9) while maintaining alignment with 120 kHz symbols. However, as already explained, issues may arise when using a relatively long excess CP before only a single symbol (at 960 kHz or above). By distributing the excess CP among two or more of the first eight symbols of the 960 kHz numerology (following the half subframe boundary), such issues can be mitigated while still maintaining symbol alignment with 120 kHz (and lower SCS) symbols.

TABLE I

| Symbols with an evenly distributed excess CP for 960 kHz SCS | Number of samples per CP with excess CP at sampling periods of 0.5 Tc and 8 Tc | Number of samples per CP without excess CP at sampling periods of 0.5 Tc and 8 Tc | CP duration (ns) with and without excess CP (approximate) |
|---|---|---|---|
| $1^{st}$ of 448 symbols of every half-subframe. | (2336, 146) | (288, 18) | (594.1, 73.2) ns |
| $1^{st}$ and $2^{nd}$ of 448 symbols of every half-subframe. | (1312, 82) | (288, 18) | (333.7, 73.2) ns |
| $1^{st}$ to $4^{th}$ of 448 symbols of every half-subframe. | (800, 50) | (288, 18) | (203.4, 73.2) ns |
| $1^{st}$ to $8^{th}$ of 448 symbols of every half-subframe. | (544, 34) | (288, 18) | (138.3, 73.2) ns |

A first row of TABLE I provides valid selections for the 960 kHz example where the excess CP is provided only before the first symbol (following the half subframe boundary) of the 448 symbols of the half subframe. The second column provides the corresponding number of CP samples with the excess CP for a sampling period of 0.5 Tc (using a 4K FFT, that is, a 4096 FFT) and for a sampling period of 8 Tc, which corresponds to FFT decimation by a factor of sixteen (e.g. using a 256 FFT). For a sampling period of 0.5 Tc, the CP with excess CP corresponds to 2336 samples. For a sampling period of 8 Tc, the CP with excess CP corresponds to 146 samples. In contrast, the number of samples for the nominal CPs of the other symbols, shown in the third column, is much smaller: 288 for 0.5 Tc and 18 for 8 Tc. the fourth column provides the corresponding CP durations with and without the excess CP: 594.1 ns and 73.2 ns, respectively. Thus, as shown in TABLE I, when the excess CP is placed only within the first symbol, the excess CP is much longer than the nominal CP.

A second row of TABLE I provides valid selections for the 960 kHz example where the excess CP is distributed evenly among the first and second symbols (following a half subframe boundary) of the 448 symbols of the half subframe. For a sampling period of 0.5 Tc, the CP with excess CP corresponds to 1312 samples. For a sampling period of 8 Tc, the CP with excess CP corresponds to 82 samples. The number of samples for the nominal CPs, is the same as in the first row: 288 for 0.5 Tc and 18 for 8 Tc. The corresponding CP durations with and without the excess CP are 333.7 ns and 73.2 ns, respectively. Thus, as shown, when the excess CP is distributed or allocated evenly to the first and second symbols, the excess CP is reduced significantly compared to keeping the excess CP entirely within the first symbol.

The third and fourth rows of TABLE I provide valid selections for examples where the excess CP is distributed or allocated among the first four symbols and all eight of the symbols, respectively. As shown, by evenly distributing the excess CP among all eight symbols, the duration of each of the CPs with excess CP is only 138.3 ns. That is, rather than having a single CP of duration 594.1 ns for the first symbol, which may cause issues, the excess CP length is greatly reduced by distributing the excess CP among all eight symbols. Even when decimated by sixteen, the number of samples is still an integer, permitting efficient digital signal processing. (Further decimation by a factor of thirty-two would, in this example, also result in integer number of samples.) It should be noted that the particular examples of TABLE I (and the examples of the tables discussed below) do not represent the only ways in which the excess CP may be distributed and are provided for illustrative (and non-limiting) purposes.

TABLE II provides valid selections of various specific numerologies for distribution of the excess CP for SCS of 1920 kHz. For the case of 120 kHz and 1920 kHz, one symbol of the 120 kHz numerology aligns with sixteen symbols of the 1920 kHz numerology. The excess CP can be placed anywhere within the first sixteen symbols (following the half subframe boundary) while maintaining symbol alignment with 120 kHz symbols. However, as with the 960 kHz example, above, distributing the excess CP among multiple symbols can mitigate issues while maintaining symbol alignment with 120 kHz (and lower SCS) symbols.

TABLE II

| Symbols with an evenly distributed excess CP for 1920 kHz SCS | Number of samples per CP with excess CP at sampling periods of 0.25 Tc and 4 Tc | Number of samples per CP without excess CP at sampling periods 0.25 Tc and 4 Tc | CP duration (ns) with and without excess CP (approximate) |
|---|---|---|---|
| $1^{st}$ of 896 symbols of every half-subframe. | (4384, 274) | (288, 18) | (557.4, 36.6) ns |
| $1^{st}$ and $2^{nd}$ of 896 symbols of every half-subframe. | (2336, 146) | (288, 18) | (297.0, 36.6) ns |
| $1^{st}$ to $4^{th}$ of 896 symbols of every half-subframe. | (1312, 82) | (288, 18) | (166.8, 36.6) ns |

TABLE II-continued

| Symbols with an evenly distributed excess CP for 1920 kHz SCS | Number of samples per CP with excess CP at sampling periods of 0.25 Tc and 4 Tc | Number of samples per CP without excess CP at sampling periods 0.25 Tc and 4 Tc | CP duration (ns) with and without excess CP (approximate) |
|---|---|---|---|
| $1^{st}$ to $8^{th}$ of 896 symbols of every half-subframe. | (800, 50) | (288, 18) | (101.7, 36.6) ns |
| $1^{st}$ to $16^{th}$ of 896 symbols of every half-subframe | (544, 34) | (288, 18) | (69.2, 36.6) ns |

As shown in TABLE II, by evenly distributing or allocating the excess CP among all sixteen symbols, the duration of each CP with an excess CP is only 69.2 ns, as compared to a duration of 557.4, if the excess CP were encoded only in the first symbol. Again, even when decimated by sixteen, the number of samples is still an integer, permitting efficient digital signal processing.

TABLE III provides valid selections for various specific numerologies for distribution of the excess CP for SCS of 3840 kHz. For the case of 120 kHz and 3840 kHz, one symbol of the 120 kHz numerology aligns with thirty-two symbols of the 3840 kHz numerology. The excess CP can be placed anywhere within the first thirty-two symbols (following the half subframe boundary) while maintaining symbol alignment with 120 kHz symbols (and lower SCS symbols). However, as with the examples, above, distributing the excess CP among multiple symbols can mitigate issues while maintaining symbol alignment with 120 kHz (and lower SCS) symbols.

TABLE III

| Symbols with an evenly distributed excess CP for 3840 kHz SCS | Number of samples per CP with excess CP at sampling periods of 0.125 Tc and 2 Tc | Number of samples per CP without excess CP at sampling periods of 0.125 Tc and 2 Tc | CP duration (ns) with and without excess CP (approximate) |
|---|---|---|---|
| $1^{st}$ of 1792 symbols of every half-subframe. | (8480, 530) | (288, 18) | (539.1, 18.3) ns |
| $1^{st}$ and $2^{nd}$ of 1792 symbols of every half-subframe. | (4384, 274) | (288, 18) | (278.7, 18.3) ns |
| $1^{st}$ to $4^{th}$ of 1792 symbols of every half-subframe. | (2336, 146) | (288, 18) | (148.5, 18.3) ns |
| $1^{st}$ to $8^{th}$ of 1792 symbols of every half-subframe. | (1312, 82) | (288, 18) | (83.4, 18.3) ns |
| $1^{st}$ to $16^{th}$ of 1792 symbols of every half-subframe. | (800, 50) | (288, 18) | (50.9, 18.3) ns |
| $1^{st}$ to $32^{nd}$ of 1792 symbols of every half-subframe. | (544, 34) | (288, 18) | (34.6, 18.3) ns |

As shown by TABLE III, by evenly distributing the excess CP among all thirty-two symbols, the duration of each of the CP with excess CP is only 34.6 ns, as compared to a CP duration of 539.1, if the excess CP were encoded only in the first symbol. Again, even when decimated by sixteen, the number of samples is still an integer number, permitting efficient digital signal processing.

TABLE IV provides valid selections for evenly distributing excess CP for transmissions where two or more of the higher SCS numerologies are employed (e.g. two or more of 960 kHz, 1920 kHz, and 3840 kHz) along with a lower SCS of 120 kHz (or lower), and while maintaining symbol alignment. For example, SCS numerologies of 120 kHz and 1920 kHz maybe employed along with an intermediate SCS numerology of 960 kHz. As another example, SCS numerologies of 120 kHz and 3840 kHz maybe employed along with an intermediate SCS numerology of 1920 kHz.

TABLE IV

| Number of OFDM symbols to evenly distribute the excess CP for 960 kHz | Number of OFDM symbols to evenly distribute the excess CP for 1920 kHz | Number of OFDM symbols to evenly distribute the excess CP for 3840 kHz |
|---|---|---|
| 1 | 1 | 2 |
| 1 | 2 | 4 |
| 2 | 4 | 8 |

TABLE IV-continued

| Number of OFDM symbols to evenly distribute the excess CP for 960 kHz | Number of OFDM symbols to evenly distribute the excess CP for 1920 kHz | Number of OFDM symbols to evenly distribute the excess CP for 3840 kHz |
|---|---|---|
| 4 | 8 | 16 |
| 8 | 16 | 32 |

Exemplary valid selections for distributing the excess CP while maintaining symbols alignment are shown in the table, where the table indicates the number of symbols at the start of each half-subframe to evenly distribute the excess CP among. For an example where 960 kHz and 1920 kHz are employed, the excess CP for 960 kHz may be distributed evenly among four (4) symbols while the excess CP for 1920 kHz is distributed evenly among eight symbols (8) while maintaining alignment to 960 kHz and 120 kHz (and lower numerologies). This particular set of valid selections for CP excess distribution shown within the second row from the bottom. Other valid selections for use with 960 kHz and 1920 kHz are listed in the other rows of the table.

For an example where 1920 kHz and 3840 kHz are employed, valid selections for the number of OFDM symbols to distribute the excess CP among are shown in the second and third columns of the table, such as {1,2} or {8,16}. In yet another example, where SCS of 960 kHz, 1920 kHz, and 3840 kHz are employed, valid selections for the number of OFDM symbols to distribute the excess CP among are shown in the various rows.

What has been described with reference to FIG. 9 and TABLES I-IV are various exemplary numerologies that evenly distribute excess CP among a set of symbols at the beginning of a subframe while maintaining symbol alignment with a lower OFDM numerology at a lower SCS. Although described primarily with reference to examples where a scheduling entity (e.g. a gNB) selects the numerology and generates the CPs and OFDM symbols, it should be understood that the scheduled entity (e.g. a UE) may perform corresponding or reciprocal operations to process CPs and OFDM symbols received using the selected numerology. In other words, both gNBs and UEs can utilize the methods of symbol alignment described herein for both transmitting and receiving CP-OFDM symbols.

Figure 10:
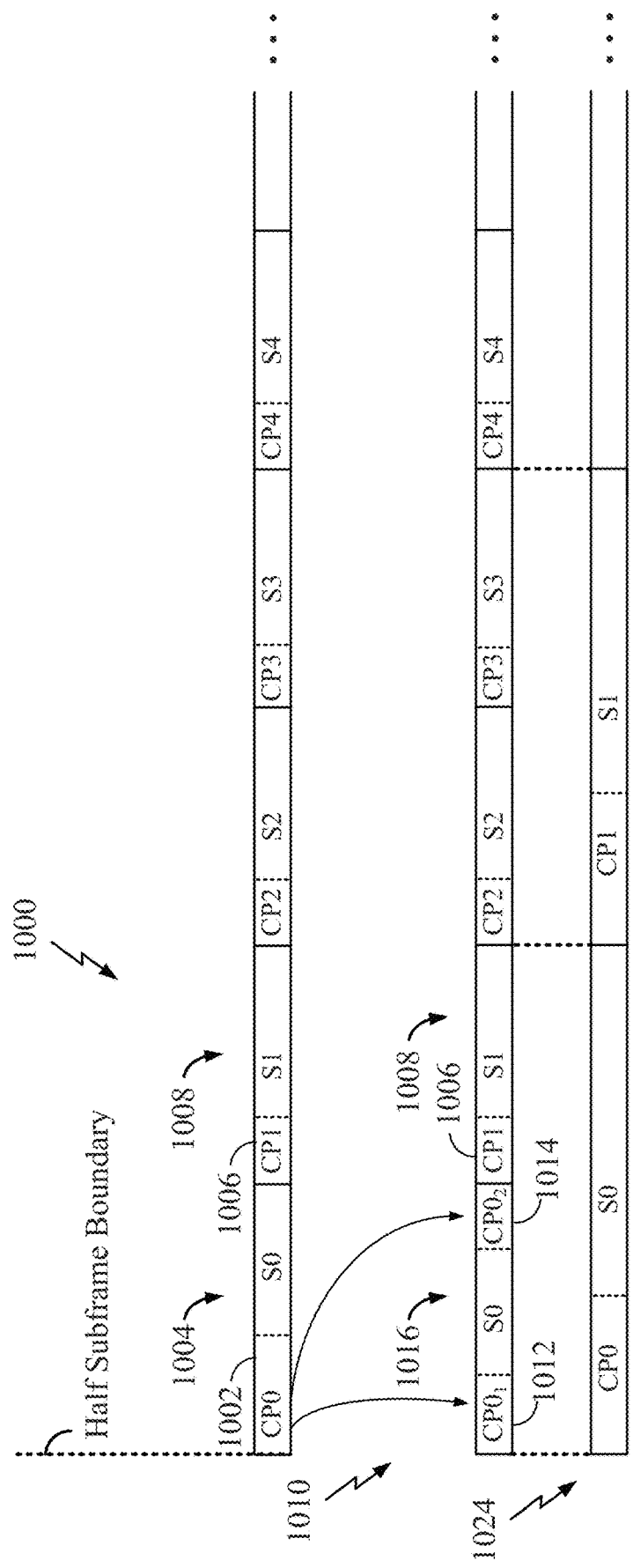
FIG. 10 is a diagram illustrating an example of multiplexing of different OFDM numerologies wherein an excess CP portion of the extended CP of the first OFDM symbol is split into separate prefix and postfix portions in accordance with aspects of the disclosure.

With reference to FIG. 10 and TABLE V, below, various exemplary numerologies will now be described that distribute or allocate the excess CP as separate prefix and postfix portions of the first symbol. These numerologies will be also primarily described with reference to a scheduling entity (e.g. a gNB) that selects the numerology but it should be understood that the scheduled entity (e.g. a UE) may perform corresponding or reciprocal operations to process CPs and OFDM symbols received using the selected numerology.

FIG. 10 illustrates a numerology wherein the aforementioned excess CP is distributed or allocated as separate prefix and postfix portions applied to the first symbol of a subframe. The figure is not necessarily to scale. As explained with reference to FIGS. 8 and 9, the symbols of a sequence are the same length and so, to accommodate different durations of a CP+a symbol, there can be differing amounts of time between symbol boundaries. Such time intervals are not shown to scale in FIG. 10.

A first sequence of symbols 1000 of a first numerology is illustrated wherein, as in FIG. 8, a CP (CP0) 1002 of a first symbol 1004 (S0) is longer than the CPs of the other symbols, such as CP1 1006 of a second symbol 1008 (S1). Within each sequence, the symbols of the sequence (such as S0, S1, S2, etc.), are each the same length. A second sequence 1010 of symbols of an updated numerology is also illustrated wherein the excess portion of CP (CP0) 1002 of the first symbol 1004 (S0) is separated into a prefix portion CP0$_1$ 1012 and a postfix portion CP0$_2$ 1014. (Arrows are provided to conceptually illustrate how the excess CP is split into the prefix and postfix portions in the updated numerology.) The symbol (S0) of sequence 1010 that has both a prefix and a postfix is identified by reference numeral 1016. The other CPs (CP1, CP2, etc.) are not changed in this procedure and hence may be of the same duration as in the sequence of symbols 1000 (e.g. they are nominal length CPs). A third sequence 1024 of symbols is also illustrated that has a lower SCS, wherein one CP-OFDM symbol of lower sequence 1024 is equal in duration to two of the CP-OFDM symbols of higher sequence 1010. As shown, the symbol boundaries of the second sequence 1010 are aligned with the symbol boundaries of the third sequence 1024. Note that the distribution of the excess CP as prefix and postfix refers to duration only: the signals transmitted in the prefix and postfix are copies of the tail and head of the OFDM symbol, respectively.

TABLE V provides valid numerological selections for splitting an excess CP into prefix and postfix portions with the postfix portion appended at the end of the first symbol (following a half subframe boundary). As with the preceding examples, the symbol boundaries remain the same so as to maintain symbol alignment. Unlike the preceding examples, the excess CP is not distributed among two or more symbols. Hence, the overall duration of the first CP-OFDM symbol of the subframe remains the same. However, by appending a postfix portion of the CP to the end of the first symbol, a gNB may use the postfix duration for beam switching after the first symbol, at least in systems and circumstances where when a 1-symbol Control Resource Set, (CORESET) is followed by a PDSCH transmission.

TABLE V

| Numerology (SCS, nominal CP duration, and excess CP duration) | Prefix + Nominal CP duration (seconds, samples at 4K FFT, and samples at 256 FFT) | Postfix duration (seconds, samples at 4K FFT, and samples at 256 FFT) |
|---|---|---|
| 960 kHz, 144 Tc, 1024 Tc | (656 Tc, 1312, 82) | (512 Tc, 1024, 64) |
| 1920 kHz, 72 Tc, 1024 Tc | (584 Tc, 2336, 146) | (512 Tc, 2048, 128) |
| 3840 kHz, 36 Tc, 1024 Tc | (548 Tc, 4384, 274) | (512 Tc, 4096, 256) |

The information in TABLE V is based on an equal subdivision of the excess CP into a prefix portion and a postfix portion. In the example of the table, for 960 kHz, the excess CP duration is 1024 Tc and the nominal CP duration is 144 Tc. One half of the excess CP (e.g. 512 Tc) of the first symbol remains as a prefix of that symbol along with the nominal CP (Prefix+Nominal CP), yielding a duration of, e.g., 656 Tc (as shown in the second column). The other half of the excess CP duration (e.g. 512 Tc) of the first symbol is appended as a postfix to the first symbol (as shown in the third column). The other rows provide similar splitting/subdivision choices for 1920 kHz and 3840 kHz. Unequal (fractional) divisions of the excess CP are also possible depending upon the decimation rate and the SCS, such as a ¼ and ¾ split in some examples. For unequal (fractional) divisions, care should be taken to select a fractional split that still provides for an integer number of samples after decimation.

Insofar as beam switching and CORESETs are concerned, in 5G NR, CORESET refers to a Control Resource Set, which is a set of physical resources within a specific area in a Downlink Resource Grid used to carry PDCCH DCI. NR PDCCHs are designed to transmit in a configurable CORESET. In some NR embodiments, the CORESET is a 1-symbol CORESET, a 2-symbol CORESET, or a 3-symbol CORESET. Exemplary CORESET configuration flexibilities of control regions including time, frequency, numerologies, and operating points. In one aspect, if the wireless communication system is configured with a 1-symbol CORESET that is followed by a PDSCH transmission, a suitably-configured gNB may use the time during the postfix to perform beamswitching (or other appropriate functions). Without that extra time, the end of the first symbol would be followed immediately by the CP at the beginning of the next symbol and, as such, would not likely permit beamswitching at that time.

Figure 11:
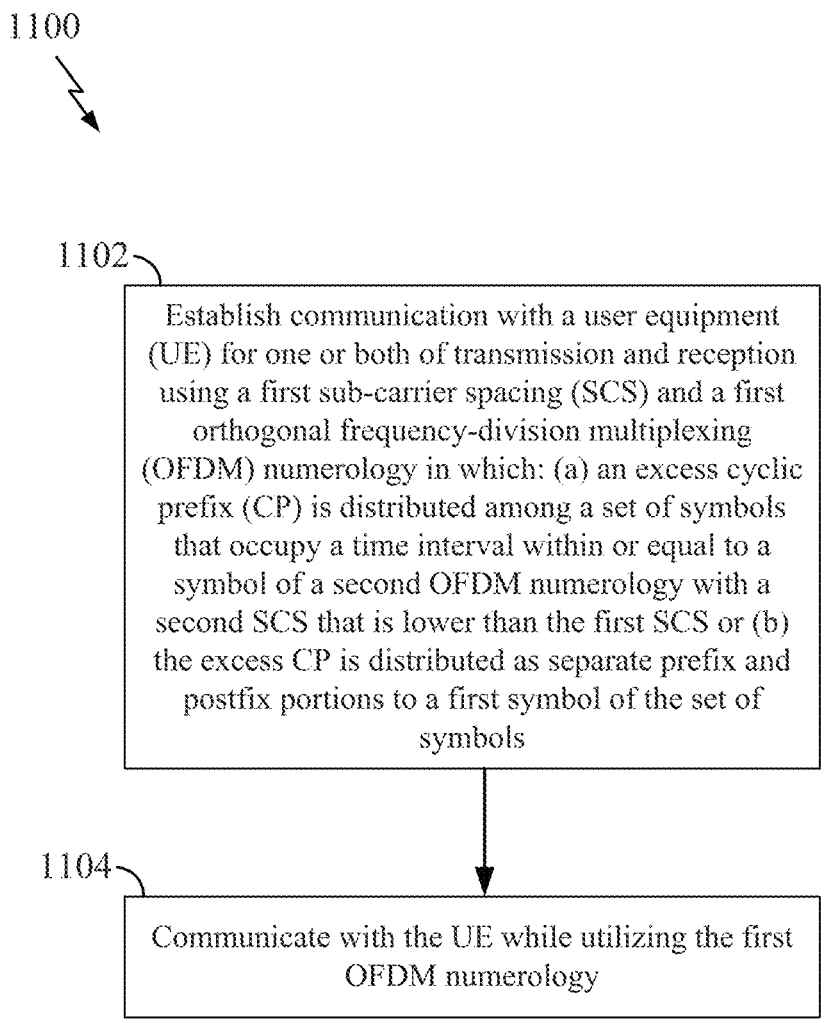
FIG. 11 is a flow chart illustrating a wireless communication method for use by a scheduling entity in accordance with aspects of the disclosure, wherein excess CP may be either distributed evenly among a set of symbols or distributed as separate prefix and postfix portions to a first symbol of a set of symbols.

FIG. 11 is a flow chart illustrating a wireless communication method 1100 according to some aspects of the disclosure. The communication method 1100 may be performed, for example, by any of the scheduling entities illustrated in the figures, such as a gNB, or by other suitably-equipped systems, devices or apparatus. At block 1102, a scheduling entity establishes communication with a UE (or other scheduled entity) for one or both of transmission and reception using a first SCS and a first OFDM numerology in which (a) an excess CP is distributed (or allocated) among a set of symbols that occupy a time interval within or equal to a symbol of a second OFDM numerology with a second SCS that is lower than the first SCS or (b) the excess CP is distributed (or allocated) as separate prefix and postfix portions to a first symbol of the set of symbols. At block 1104, the scheduling entity communicates with the UE while utilizing, at least, the first OFDM numerology. As discussed below, the gNB may also communicate with the UE (or with other UEs) using the second OFDM numerology. The communication involves both the transmission and the reception of CP-OFDM symbols.

Figure 12:
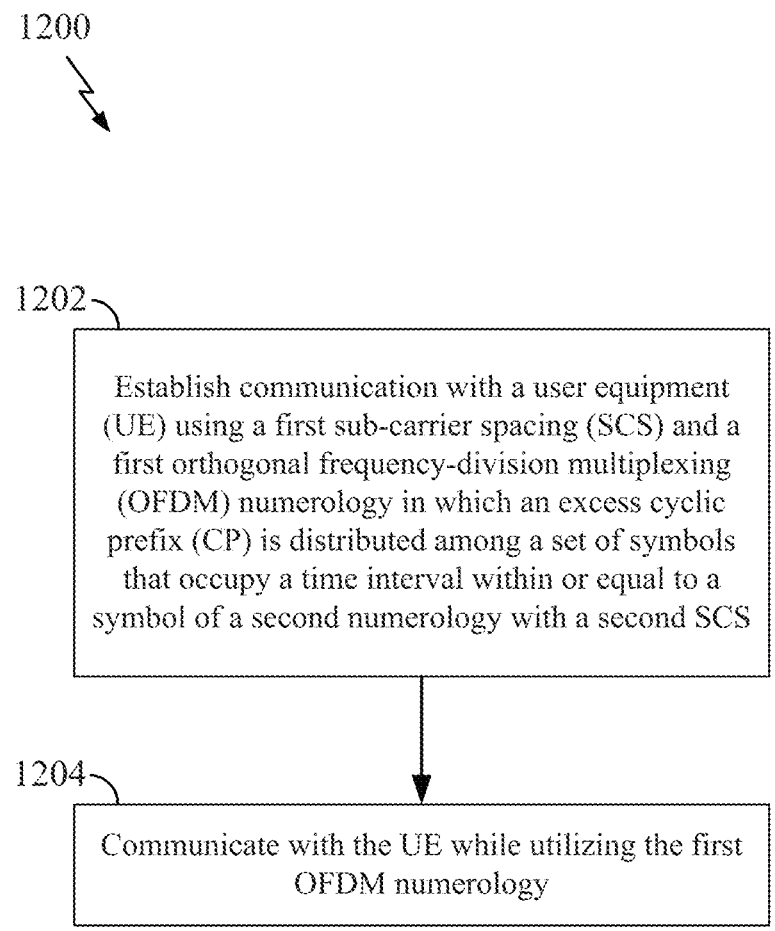
FIG. 12 is another flow chart illustrating a wireless communication method for use by a scheduling entity in accordance with aspects of the disclosure, wherein excess CP is distributed evenly among a set of symbols.

FIG. 12 is a flow chart illustrating a wireless communication method 1200 according to some aspects of the disclosure that employs, at least, method (a) of FIG. 11. The communication method 1200 may be performed, for example, by any of the scheduling entities illustrated in the figures, or by other suitably-equipped systems, devices or apparatus. At block 1202, a scheduling entity establishes communication with a UE (or other scheduled entity) using a first SCS and a first OFDM numerology in which an excess CP is distributed (or allocated) among a set of symbols that occupy a time interval within or equal to a symbol of a second numerology with a lower SCS. At block 1204, the scheduling entity communicates with the UE while utilizing the first OFDM numerology.

Figure 13:
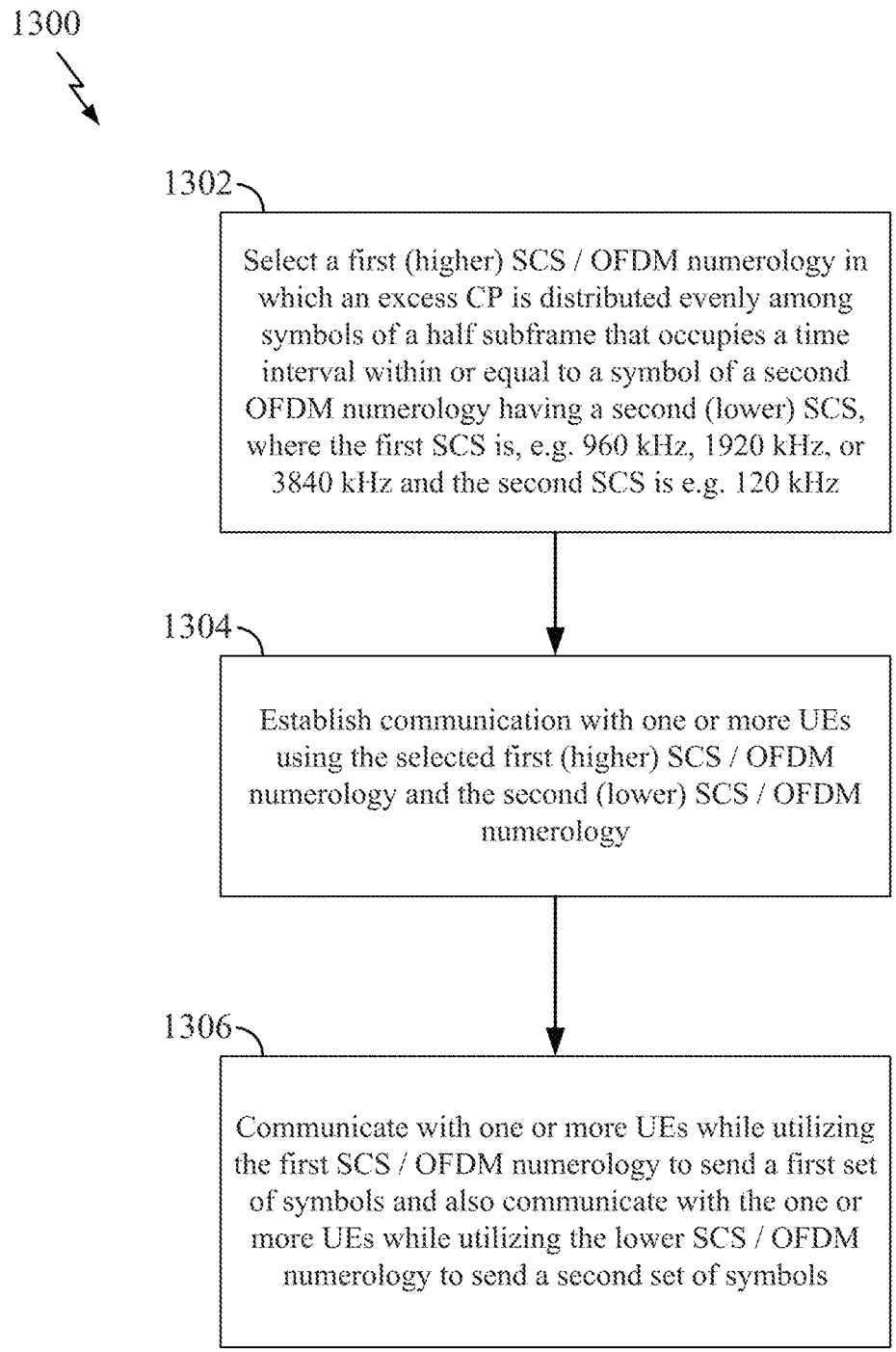
FIG. 13 is another flow chart illustrating a wireless communication method for use by a scheduling entity in accordance with aspects of the disclosure, wherein excess CP is distributed evenly among a set of symbols and further illustrating communication using a second OFDM at a second SCS.

FIG. 13 is a flow chart illustrating a wireless communication method 1300 according to some aspects of the disclosure that employs features of method (a) of FIG. 11. The communication method 1300 may be performed, for example, by any of the scheduling entities illustrated in the figures, or by other suitably-equipped systems, devices or apparatus. At block 1302, a scheduling entity selects a first (higher) SCS/OFDM numerology in which an excess CP is distributed (or allocated) evenly among symbols of a half subframe that occupies a time interval within or equal to a symbol of a second OFDM numerology having a second (lower) SCS, where the first SCS is, e.g., 960 kHz, 1920 kHz, or 3840 kHz and the second SCS is 120 kHz. At block 1304, the scheduling entity establishes communication with one or more UEs using the selected first (higher) SCS/ OFDM numerology and the second (lower) SCS/OFDM numerology. At block 1306, the scheduling entity communicates with one or more UEs while utilizing the first SCS/OFDM numerology to send a first set of symbols and also communicates with the one or more UEs while utilizing the lower SCS/OFDM numerology to send a second set of symbols.

Figure 14:
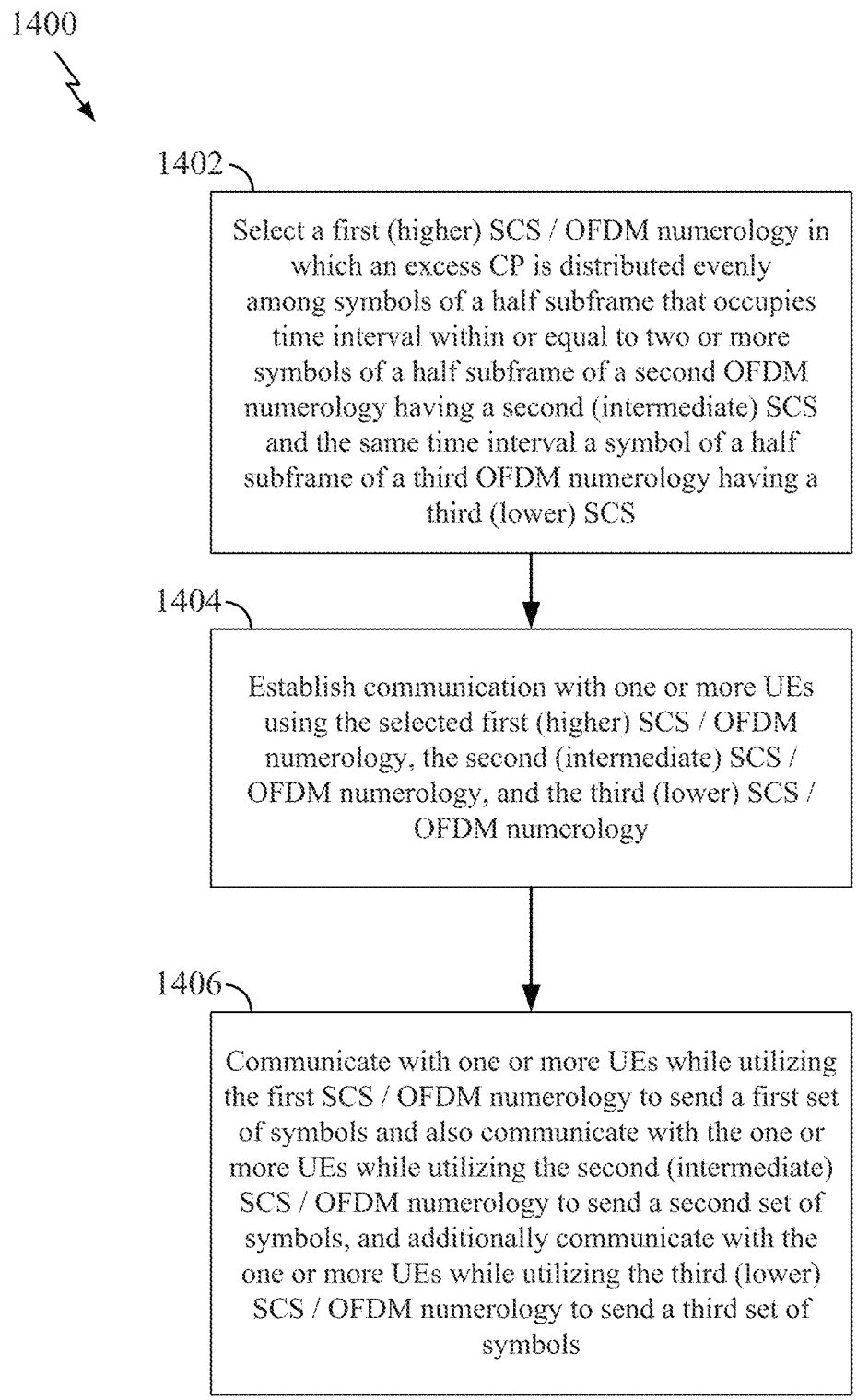
FIG. 14 is another flow chart illustrating a wireless communication method for use by a scheduling entity in accordance with aspects of the disclosure, wherein excess CP is distributed evenly among a set of symbols and further illustrating communication using a third OFDM at a third SCS.

FIG. 14 is a flow chart illustrating a wireless communication method 1400 according to some aspects of the disclosure that employs features of method (a) of FIG. 11. The communication method 1400 may be performed, for example, by any of the scheduling entities illustrated in the figures, or by other suitably-equipped systems, devices or apparatus. At block 1402, a scheduling entity selects a first (higher) SCS/OFDM numerology in which an excess CP is distributed (or allocated) evenly among symbols of a half subframe that occupies a time interval the same or equal to two or more symbols of a half subframe of a second OFDM numerology having a second (intermediate) SCS and the same time interval a symbol of a half subframe of a third OFDM numerology having a third (lower) SCS. The first SCS may be, e.g., 1920 kHz or 3840 kHz, the second, intermediate SCS may be 960 kHz, and the third (lower) SCS may be 120 kHz. At block 1404, the scheduling entity establishes communication with one or more UEs using the selected first (higher) SCS/OFDM numerology, the second (intermediate) SCS/OFDM numerology, and the third (lower) SCS/OFDM numerology. At block 1406, the scheduling entity communicates with one or more UEs while utilizing the first SCS/OFDM numerology to send a first set of symbols and also communicates with the one or more UEs while utilizing the second (intermediate) SCS/OFDM numerology to send a second set of symbols, and additionally communicates with the one or more UEs while utilizing the third (lower) SCS/OFDM numerology to send a third set of symbols.

Figure 15:
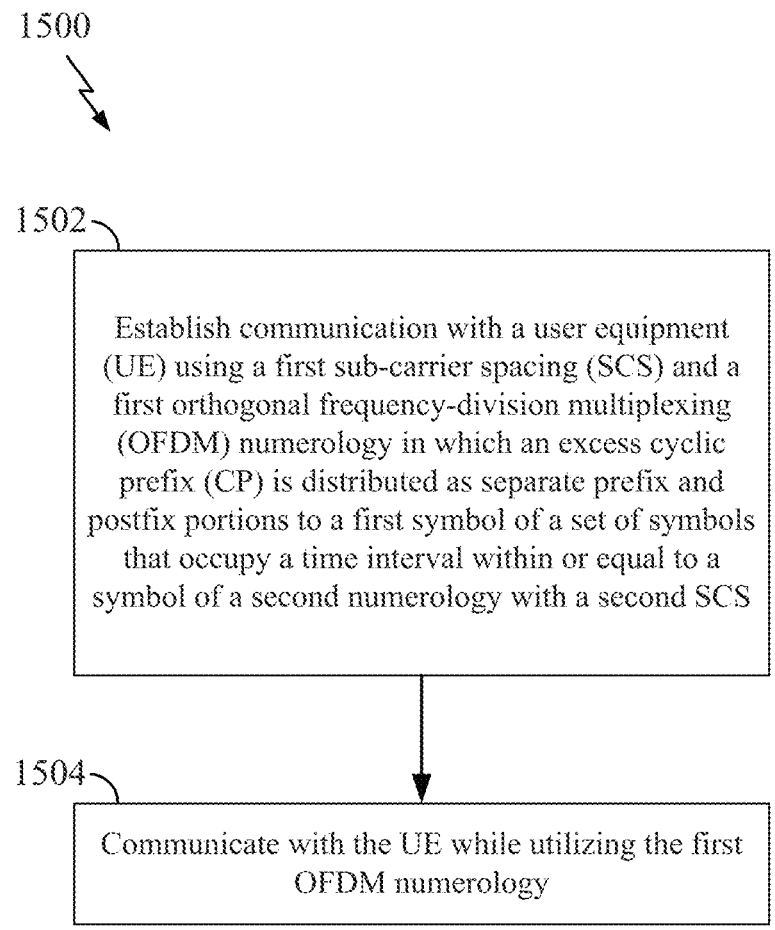
FIG. 15 is another flow chart illustrating a wireless communication method for use by a scheduling entity in accordance with aspects of the disclosure, wherein excess CP is distributed as separate prefix and postfix portions to a first symbol of a set of symbols.

FIG. 15 is a flow chart illustrating a wireless communication method 1500 according to some aspects of the disclosure that employs, at least, method (b) of FIG. 11. The communication method 1500 may be performed, for example, by any of the scheduling entities illustrated in the figures, or by other suitably-equipped systems, devices or apparatus. At block 1502, a scheduling entity establishes communication with a UE using a first SCS and a first OFDM numerology in which an excess CP is distributed (or allocated) as separate prefix and postfix portions to a first symbol of a set of symbols that occupy a time interval within or equal to a symbol of a second numerology with a second SCS that is lower than the first SCS. At block 1504, the scheduling entity communicates with the UE while utilizing the first OFDM numerology.

Figure 16:
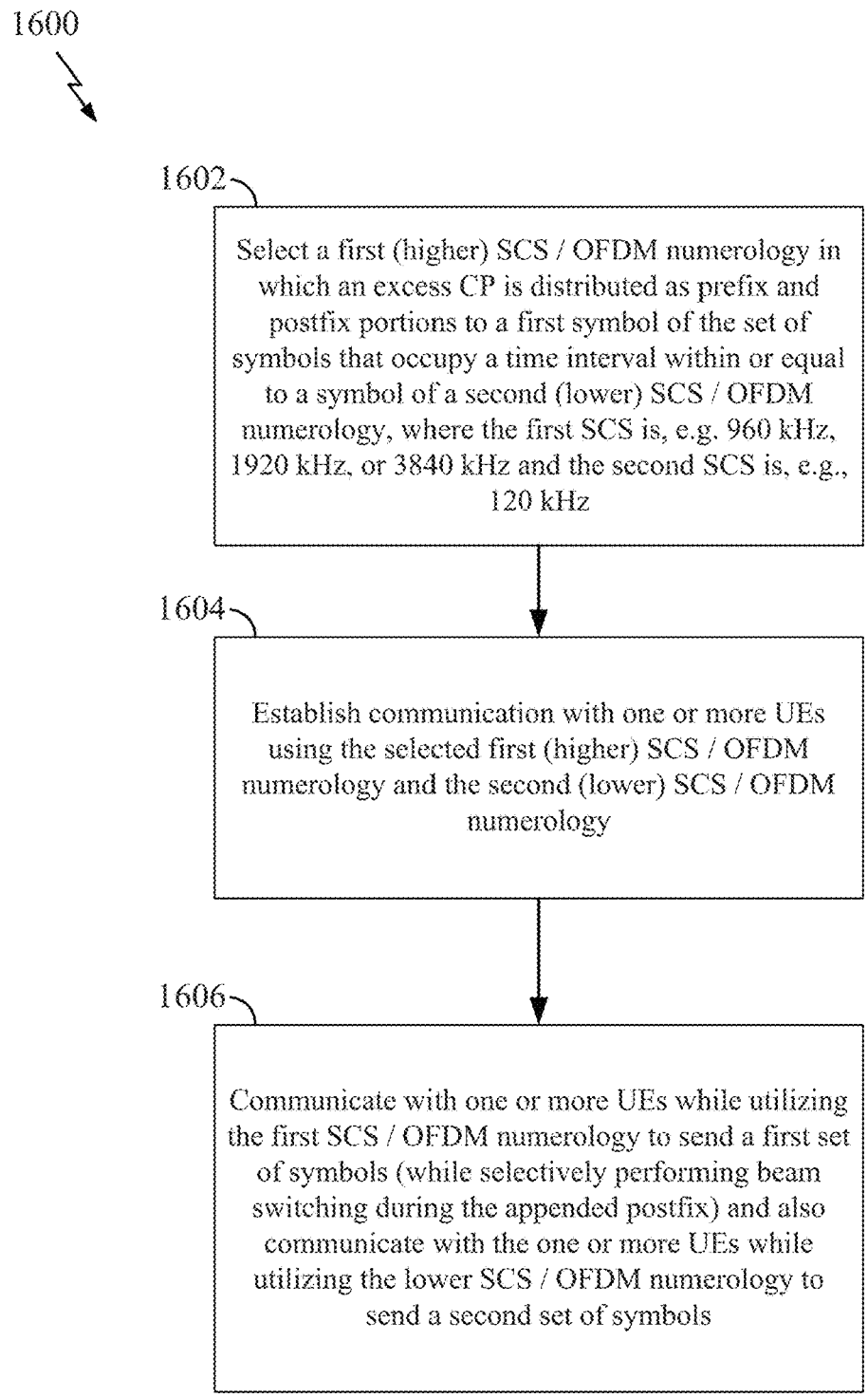
FIG. 16 is another flow chart illustrating a wireless communication method for use by a scheduling entity in accordance with aspects of the disclosure, wherein excess CP is distributed as separate prefix and postfix portions to a first symbol of a set of symbols and further illustrating communication using a second OFDM at a second SCS.

FIG. 16 is a flow chart illustrating a wireless communication method 1600 according to some aspects of the disclosure that employs features of method (b) of FIG. 11. The communication method 1600 may be performed, for example, by any of the scheduling entities illustrated in the figures, or by other suitably-equipped systems, devices or apparatus. At block 1602, a scheduling entity selects a first (higher) SCS/OFDM numerology in which an excess CP is distributed (or allocated) as prefix and postfix portions to a first symbol of the set of symbols that occupy a time interval within or equal to a symbol of a second (lower) SCS/OFDM numerology, where the first SCS is, e.g. 960 kHz, 1920 kHz, or 3840 kHz and the second SCS is, e.g., 120 kHz. At block 1604, the scheduling entity establishes communication with one or more UEs using the selected first (higher) SCS/ OFDM numerology and the second (lower) SCS/OFDM numerology. At block 1604, the scheduling entity communicates with one or more UEs while utilizing the first SCS/OFDM numerology to send a first set of symbols (while selectively performing beam switching during the appended postfix) and also communicates with the one or more UEs while utilizing the lower SCS/OFDM numerology to send a second set of symbols.

Figure 17:
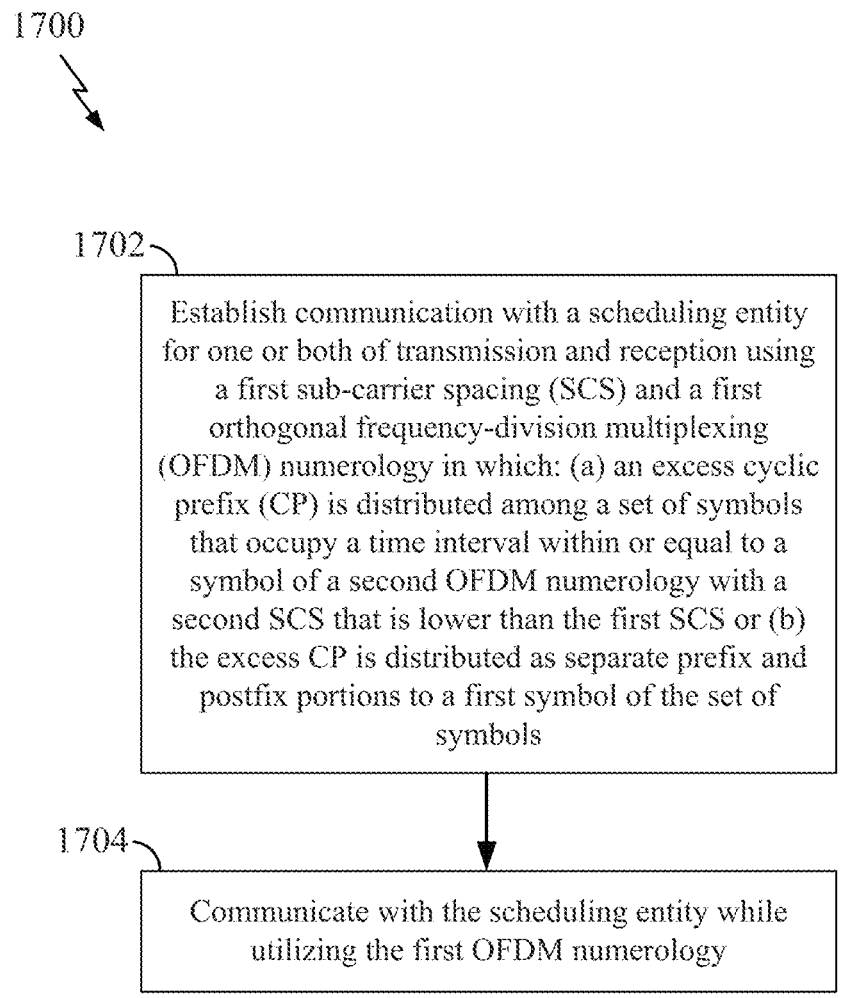
FIG. 17 is a flow chart illustrating a wireless communication method for use by a scheduled entity (e.g. UE) in accordance with aspects of the disclosure, wherein excess CP may be either distributed evenly among a set of symbols or distributed as separate prefix and postfix portions to a first symbol of a set of symbols.

FIG. 17 is a flow chart illustrating a wireless communication method 1700 according to some aspects of the disclosure. The communication method 1700 may be performed, for example, by any of the scheduled entities illustrated in the figures, such as a UE, or by other suitably-equipped systems, devices or apparatus. At block 1702, a scheduled entity (e.g. a UE) establishes communication with a scheduling entity (e.g. a gNB) for one or both of transmission and reception using a first SCS and a first OFDM numerology in which (a) an excess CP is distributed (or allocated) among a set of symbols that occupy a time interval within or equal to a symbol of a second OFDM numerology with a second SCS that is lower than the first SCS or (b) the excess CP is distributed (or allocated) as separate prefix and postfix portions to a first symbol of the set of symbols. At block 1704, the scheduled entity communicates with the scheduling entity while utilizing, at least, the first OFDM numerology. The communication involves both the transmission and reception of OFDM symbols.

Several aspects of a wireless communication network have been presented with reference to an exemplary implementation. As those skilled in the art will readily appreciate, various aspects described throughout this disclosure may be extended to other telecommunication systems, network architectures and communication standards.

Figure 18:
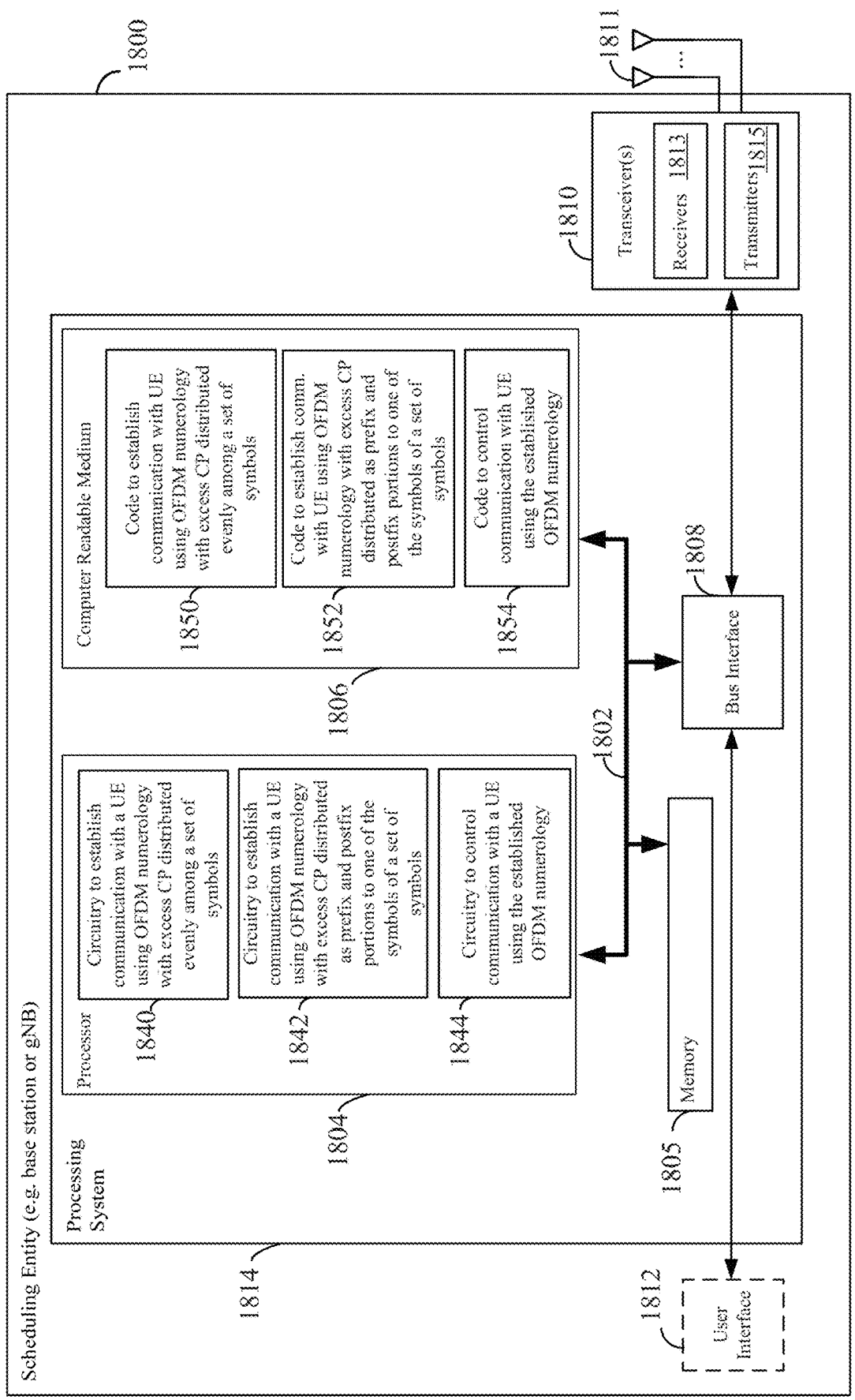
FIG. 18 is a block diagram illustrating an example of an example of a hardware implementation of a scheduling entity (e.g. base station or gNB) of a wireless communication network having various components configured to establish and control communication with a user equipment (or other scheduled entity) using OFDM numerologies that distribute excess CP.

FIG. 18 is a block diagram illustrating an example of a hardware implementation for a scheduling entity 1800 employing a processing system 1814. For example, the scheduling entity may correspond to a base station as shown in FIG. 1 (e.g. base stations 110 or 112). The scheduling entity 1800 of FIG. 18 provides an alternative representation of the scheduling entity of FIG. 6 that employs somewhat different language to refer to the components of the processing system.

The processing system 1814 includes one or more processors 1804. Examples of processors 1804 include microprocessors, microcontrollers, DSPs, FPGAs, PLDs, state machines, gated logic, discrete hardware circuits, and other suitable hardware configured to perform the various functionality described throughout this disclosure. In various examples, the scheduling entity 1800 may be configured to perform any one or more of the scheduling entity functions described herein. That is, the processor 1804, as utilized in the scheduling entity 1800, may be used to implement any one or more of the processes and procedures described herein that pertain to the operation of a base station.

The overall architecture of the processing system 1814 may be similar to the processing system 614 illustrated in FIG. 6, including a bus interface 1808, a bus 1802, memory 1805, a processor 1804, and a computer-readable medium 1806. Furthermore, the scheduling entity 1800 may include a user interface 1812 and a transceiver 1810 for communicating with various other apparatus (e.g., a UE) over a transmission medium. In FIG. 18, the transceiver 1810 is shown to include one or more receivers 1813 and one or more transmitters 1815, which are connected to one or more antennas 1811.

The processor 1804 is responsible for managing the bus 1802 and general processing, including the execution of software stored on the computer-readable medium 1806. The software, when executed by the processor 1804, causes the processing system 1814 to perform the various functions described below for any particular apparatus. The computer-readable medium 1806 and the memory 1805 may also be used for storing data that is manipulated by the processor 1804 when executing software.

The computer-readable medium 1806 may be a non-transitory computer-readable medium. The computer-readable medium 1806 may reside in the processing system 1814, external to the processing system 1814, or distributed across multiple entities including the processing system 1814. The computer-readable medium 1806 may be embodied in a computer program product. By way of example, a computer program product may include a computer-readable medium in packaging materials. In some examples, the computer-readable medium 1806 may be part of the memory 1805.

In some aspects of the disclosure, the processor 1804 may include circuitry configured for various functions. In some network components, different functions may be performed by different components or nodes within the network, and so separate processors may be provided within the different nodes for performing different functions. For convenience and generality, the processor 1804 of FIG. 18 is shown as having a set of processing components, controllers, or circuits.

In the example of FIG. 18, the processor 1804 may include circuitry 1840 configured to establish communication with UE using OFDM numerology with excess CP distributed evenly among a set of symbols. For example, circuitry 1840 may be configured to establish communication with a UE using a first SCS and a first OFDM numerology wherein an excess CP is distributed among a set of symbols that occupy a time interval within or equal to a corresponding time interval of a symbol of a second OFDM numerology with a second SCS lower than the first SCS. Referring again to FIG. 9, the time interval of a symbol of a second OFDM numerology may be the time interval corresponding to CP0 and S0 of the sequence 924. That is, the time interval of a symbol of a second OFDM numerology may be the CP-OFDM time interval between the vertical dashed lines that demarcate the beginning of CP0 of 924 and the end of S0 of 924. As explained above, one CP-OFDM symbol (CP+OFDM symbol) of lower sequence 924 is equal in duration to two of the CP-OFDM symbols of higher sequence 910. The excess portions of the CPs (e.g. CP0' and CP1') of the second sequence 910 are distributed by circuitry 1840 so that symbol alignment is preserved or maintained with the symbol boundaries of the sequence 924.

The processor 1804 may also include circuitry 1842 configured to establish communication with a UE using OFDM numerology with excess CP distributed as prefix and postfix portions to one of the symbols of a set of symbols. For example, circuitry 1842 may be configured to establish communication with a UE using a first SCS and a first OFDM numerology wherein the excess CP is distributed as separate prefix and postfix portions to one of the symbols of a set of symbols that occupy a time interval within or equal to a corresponding time interval of a symbol of a second OFDM numerology with a second SCS lower than the first SCS. The processor 1804 may further include circuitry 1844 configured to control communications with the UE using the established OFDM numerology. For example, circuitry 1844 may be configured to communicate with the UE via the communication interface using the first OFDM numerology at the first SCS.

In some aspects, the circuitry 1840 is a means for establishing communication with a UE using a first SCS and a first OFDM numerology wherein an excess CP is distributed among a set of symbols that occupy a time interval within or equal to a corresponding time interval of a symbol of a second OFDM numerology with a second SCS that is lower than the first SCS. In some aspects, the circuitry 1842 is a means for establishing communication with a UE using a first SCS and a first OFDM numerology, wherein the excess CP is distributed as prefix and postfix portions to one of the symbols of a set of symbols that occupy a time interval within or equal to a corresponding time interval of a symbol of a second OFDM numerology with a second SCS that is lower than the first SCS. In some aspects, the circuitry 1844 is a means for communicating with the UE via the communication interface using the first OFDM numerology at the first SCS.

In the example of FIG. 18, the computer-readable medium 1806 may include code 1850 for establishing communication with UE using OFDM numerology with excess CP distributed evenly among a set of symbols. For example, code 1850 may be provided to establish communication with a UE using a first SCS and a first OFDM numerology wherein an excess CP is distributed among a set of symbols that occupy a time interval within or equal to a corresponding time interval of a symbol of a second OFDM numerology with a second SCS lower than the first SCS. The code 1852 may be provided to establish communication with a UE using OFDM numerology with excess CP distributed as prefix and postfix portions to one of the symbols of a set of symbols. For example, code 1852 may be provided to establish communication with a UE using a first SCS and a first OFDM numerology wherein the excess CP is distributed as prefix and postfix portions to one of the symbols of a set of symbols that occupy a time interval within or equal to a corresponding time interval of a symbol of a second OFDM numerology with a second SCS lower than the first SCS. Code 1854 may be provided to control communications with the UE using the established OFDM numerology. For example, code 1854 may be provided to communicate with the UE via the communication interface using the first OFDM numerology at the first SCS.

Figure 19:
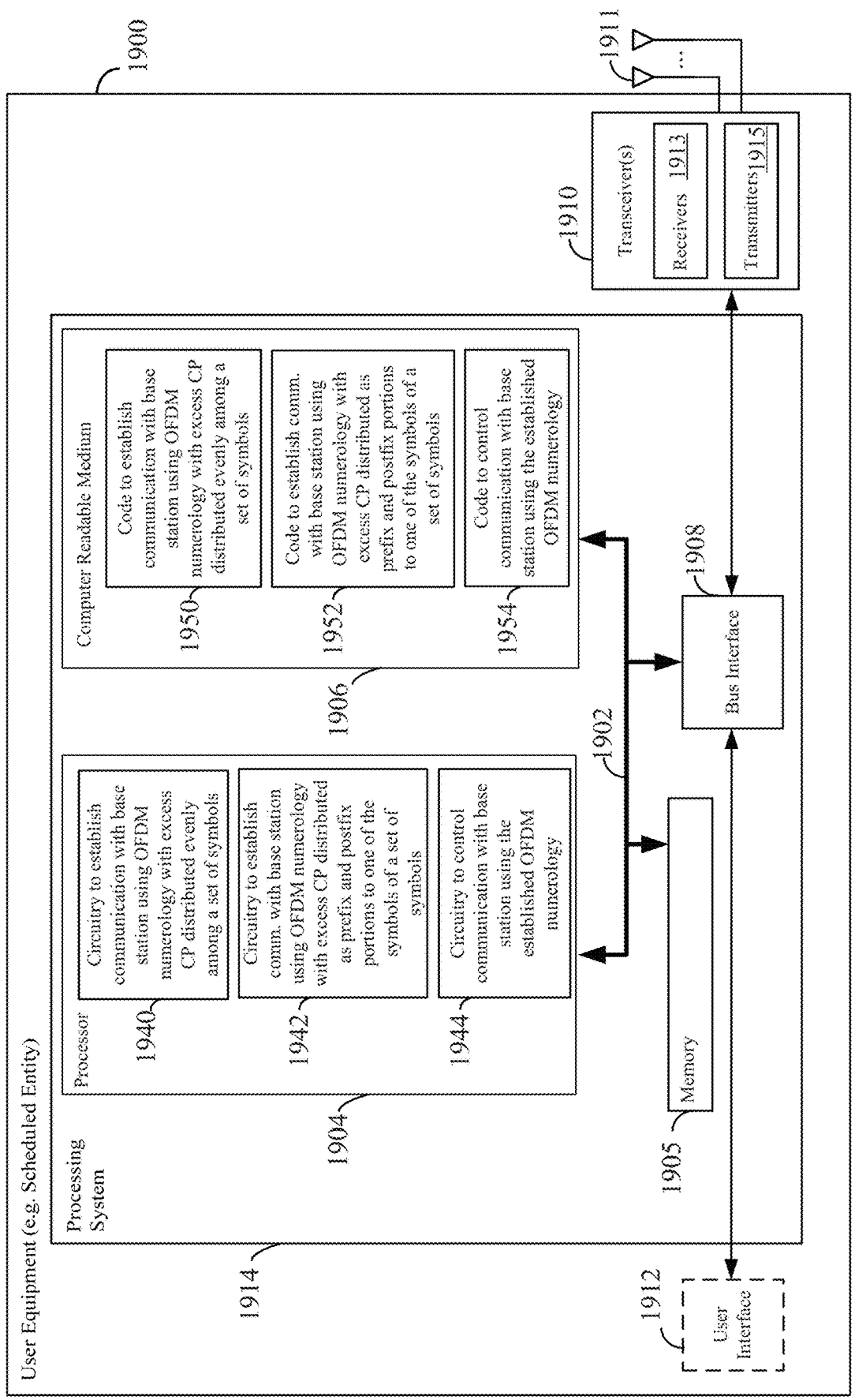
FIG. 19 is a block diagram illustrating an example of a hardware implementation of a UE (e.g. scheduled entity) of a wireless communication network having various components configured to establish and control communication with a base station (or other scheduling entity) using OFDM numerologies that distribute excess CP.

FIG. 19 is a block diagram illustrating an example of a hardware implementation for a UE 1900 employing a processing system 1914. For example, the UE may correspond to a UE as shown in FIG. 1 (e.g. UE 126 or 128). The UE 1900 of FIG. 19 provides an alternative representation of the scheduled entity of FIG. 7 that employs somewhat different language to refer to the components of the processing system. A UE may also be referred to as a scheduled entity, an MS, a subscriber station, a mobile unit, a subscriber unit, a wireless unit, a remote unit, a mobile device, a wireless device, a wireless communications device, a remote device, a mobile subscriber station, an AT, a mobile terminal, a wireless terminal, a remote terminal, a handset, a terminal, a user agent, a mobile client, a client, or some other suitable terminology. As already explained, a UE may be an apparatus that provides a user with access to network services.

The processing system 1914 includes one or more processors 1904. In various examples, the UE 1900 may be configured to perform any one or more of the UE functions described herein. That is, the processor 1904, as utilized in the UE 1900, may be used to implement any one or more of the processes and procedures described herein that pertain to the operation of a UE or other scheduled entity.

The overall architecture of the processing system 1914 may be similar to the processing system 614 illustrated in FIG. 6 and processing system 1814 of FIG. 18, including a bus interface 1908, a bus 1902, memory 1905, a processor 1904, and a computer-readable medium 1906. Furthermore, the UE 1900 may include a user interface 1912 and a transceiver 1910 for communicating with various other apparatus (e.g., a base station) over a transmission medium. In FIG. 19, the transceiver 1910 is shown to include one or more receivers 1913 and one or more transmitters 1915, which are connected to one or more antennas 1911.

The processor 1904 is responsible for managing the bus 1902 and general processing, including the execution of software stored on the computer-readable medium 1906. The software, when executed by the processor 1904, causes the processing system 1914 to perform the various functions described below for any particular apparatus. The computer-readable medium 1906 and the memory 1905 may also be used for storing data that is manipulated by the processor 1904 when executing software.

The computer-readable medium 1906 may be a non-transitory computer-readable medium. The computer-readable medium 1906 may reside in the processing system 1914, external to the processing system 1914, or distributed across multiple entities including the processing system 1914. The computer-readable medium 1906 may be embodied in a computer program product. By way of example, a computer program product may include a computer-readable medium in packaging materials. In some examples, the computer-readable medium 1906 may be part of the memory 1905.

In some aspects of the disclosure, the processor 1904 may include circuitry configured for various functions. In some UEs, different functions may be performed by different components within the UE, and so separate processors may be provided within the UE for performing different functions. For convenience and generality, the processor 1904 of FIG. 19 is shown as having a set of processing components, controllers, or circuits.

In the example of FIG. 19, the processor 1904 may include circuitry 1940 configured to establish communication with base station using OFDM numerology with excess CP distributed evenly among a set of symbols. For example, circuitry 1940 may be configured to establish communication with a base station using a first SCS and a first OFDM numerology wherein an excess CP is distributed among a set of symbols that occupy a time interval within or equal to a corresponding time interval of a symbol of a second OFDM numerology with a second SCS lower than the first SCS. Referring once again to FIG. 9, the time interval of a symbol of a second OFDM numerology may be the time interval corresponding to CP0 and S0 of the sequence 924. That is, the time interval of a symbol of a second OFDM numerology may be the CP-OFDM time interval between the vertical dashed lines that demarcate the beginning of CP0 of 924 and the end of S0 of 924. The excess portions of the CPs (e.g. CP0' and CP1') of the second sequence 910 are distributed by the circuitry 1940 so that symbol alignment is preserved or maintained with the symbol boundaries of the sequence 924.

The processor 1904 may also include circuitry 1942 configured to establish communication with a base station using OFDM numerology with excess CP distributed as prefix and postfix portions to one of the symbols of a set of symbols. For example, circuitry 1942 may be configured to establish communication with a base station using a first SCS and a first OFDM numerology wherein the excess CP is distributed as separate prefix and postfix portions to one of the symbols of a set of symbols that occupy a time interval within or equal to a corresponding time interval of a symbol of a second OFDM numerology with a second SCS lower than the first SCS. The processor 1904 may further include circuitry 1944 configured to control communications with the base station using the established OFDM numerology. For example, circuitry 1944 may be configured to communicate with the base station via the communication interface using the first OFDM numerology at the first SCS.

In some aspects, the circuitry 1940 is a means for establishing communication with a base station using a first SCS and a first OFDM numerology wherein an excess CP is distributed among a set of symbols that occupy a time interval within or equal to a corresponding time interval of a symbol of a second OFDM numerology with a second SCS that is lower than the first SCS. In some aspects, the circuitry 1942 is a means for establishing communication with a base station using a first SCS and a first OFDM numerology, wherein the excess CP is distributed as prefix and postfix portions to one of the symbols of a set of symbols that occupy a time interval within or equal to a corresponding time interval of a symbol of a second OFDM numerology with a second SCS that is lower than the first SCS. In some aspects, the circuitry 1944 is a means for communicating with the base station via the communication interface using the first OFDM numerology at the first SCS.

In the example of FIG. 19, the computer-readable medium 1906 may include code 1950 for establishing communication with base station using OFDM numerology with excess CP distributed evenly among a set of symbols. For example, code 1950 may be configured to establish communication with a base station using a first SCS and a first OFDM numerology wherein an excess CP is distributed among a set of symbols that occupy a time interval within or equal to a corresponding time interval of a symbol of a second OFDM numerology with a second SCS lower than the first SCS. The code 1952 may be configured to establish communication with a base station using OFDM numerology with excess CP distributed as prefix and postfix portions to one of the symbols of a set of symbols. For example, code 1952 may be configured to establish communication with a base station using a first SCS and a first OFDM numerology wherein the excess CP is distributed as prefix and postfix portions to one of the symbols of a set of symbols that occupy a time interval within or equal to a corresponding time interval of a symbol of a second OFDM numerology with a second SCS lower than the first SCS. Code 1954 may be configured to control communications with the base station using the established OFDM numerology. For example, code 1954 may be configured to communicate with the base station via the communication interface using the first OFDM numerology at the first SCS.

Figure 20:
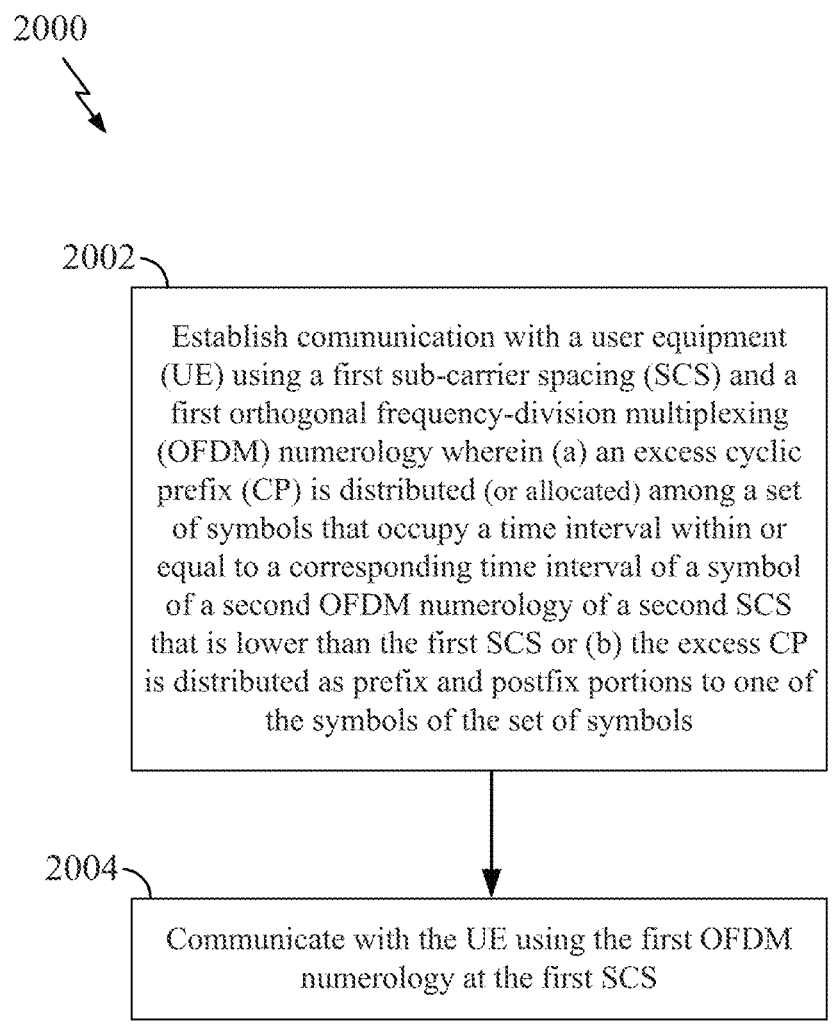
FIG. 20 is another flow chart illustrating a wireless communication method for use by a scheduling entity (e.g. base station) in accordance with aspects of the disclosure, wherein excess CP may be either distributed (or allocated) evenly among a set of symbols or distributed (or allocated) as prefix and postfix portions to a first symbol of a set of symbols.

FIG. 20 is a flow chart illustrating a wireless communication method 2000 according to some aspects of the disclosure. The communication method 2000 may be performed, for example, by any of the scheduling entities illustrated in the figures, such as a base station, or by other suitably-equipped systems, devices or apparatus. At block 2002, a scheduling entity (e.g. a base station) establishes communication with a UE (or other scheduled entity) using a first SCS and a first OFDM numerology wherein (a) an excess CP is distributed (or allocated) among a set of symbols that occupy a time interval within or equal to a corresponding time interval of a symbol of a second OFDM numerology of a second SCS that is lower than the first SCS or (b) the excess CP is distributed (or allocated) as prefix and postfix portions to one of the symbols of the set of symbols. At block 2004, the scheduling entity communicates with the UE using the first OFDM numerology at the first SCS. Additionally, as already explained, communication may also be performed using the second OFDM at the second SCS, and using other OFDM numerologies at still other SCSs.

Figure 21:
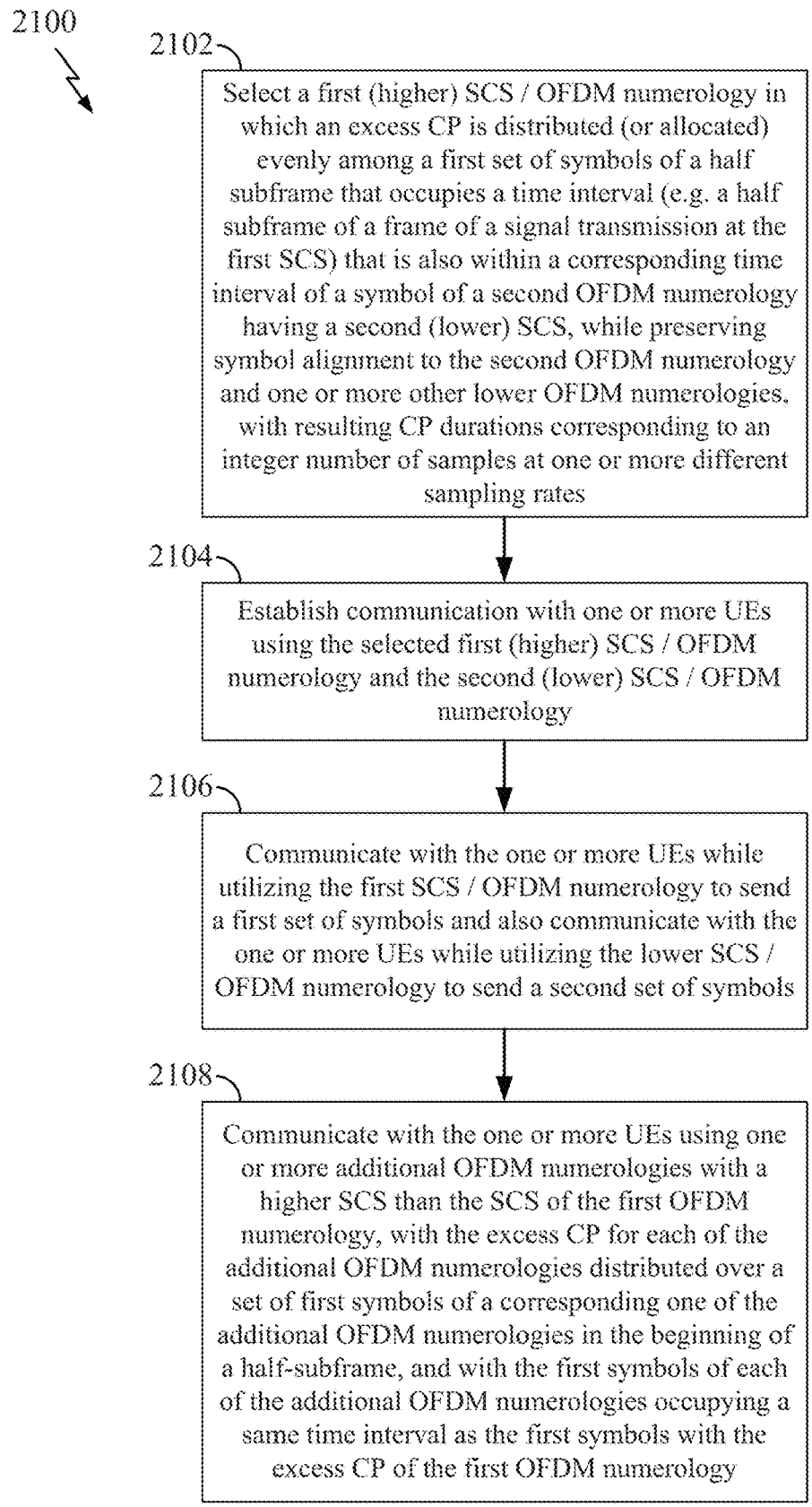
FIG. 21 is another flow chart illustrating a wireless communication method for use by a scheduling entity (e.g. base station) in accordance with aspects of the disclosure, wherein excess CP is distributed evenly among a set of symbols and further illustrating communication using a second OFDM at a second SCS and one or more additional OFDM numerologies.

FIG. 21 is a flow chart illustrating a wireless communication method 2100 according to some aspects of the disclosure that employs features of method (a) of FIG. 20. The communication method 2100 may be performed, for example, by any of the scheduling entities (e.g. base stations) illustrated in the figures, or by other suitably-equipped systems, devices or apparatus. At block 2102, a scheduling entity selects a first (higher) SCS/OFDM numerology in which an excess CP is distributed (or allocated) evenly among a first set of symbols of a half subframe that occupies a time interval (e.g. a half subframe of a frame of a signal transmission at the first SCS) that is also within a corresponding time interval of a symbol of a second OFDM numerology having a second (lower) SCS, while preserving or maintaining (or providing for) symbol alignment to the second OFDM numerology and one or more other lower OFDM numerologies, with resulting CP durations corresponding to an integer number of samples at one or more different sampling rates. In some aspects, the number of first symbols (e.g., the first set of symbols) over which the excess CP is evenly distributed is given by (or may be represented by) $2^N$, where N is any integer from 0 to log 2(1st SCS/2nd SCS).

At block 2104, the scheduling entity establishes communication with one or more UEs using the selected first (higher) SCS/OFDM numerology and the second (lower) SCS/OFDM numerology. At block 2106, the scheduling entity communicates with one or more UEs while utilizing the first SCS/OFDM numerology to send a first set of symbols and also communicates with the one or more UEs while utilizing the lower SCS/OFDM numerology to send a second set of symbols. At block 2108, the scheduling entity may also communicate with the one or more UEs using one or more additional OFDM numerologies with a higher SCS than the SCS of the first OFDM numerology, with the excess CP for each of the additional OFDM numerologies distributed over a set of first symbols of a corresponding one of the additional OFDM numerologies in the beginning of a half-subframe, and with the first symbols of each of the additional OFDM numerologies occupying a same time interval as the first symbols with the excess CP of the first OFDM numerology. For illustrative examples of these features, see FIGS. 8-10 and their descriptions provided above.

Figure 22:
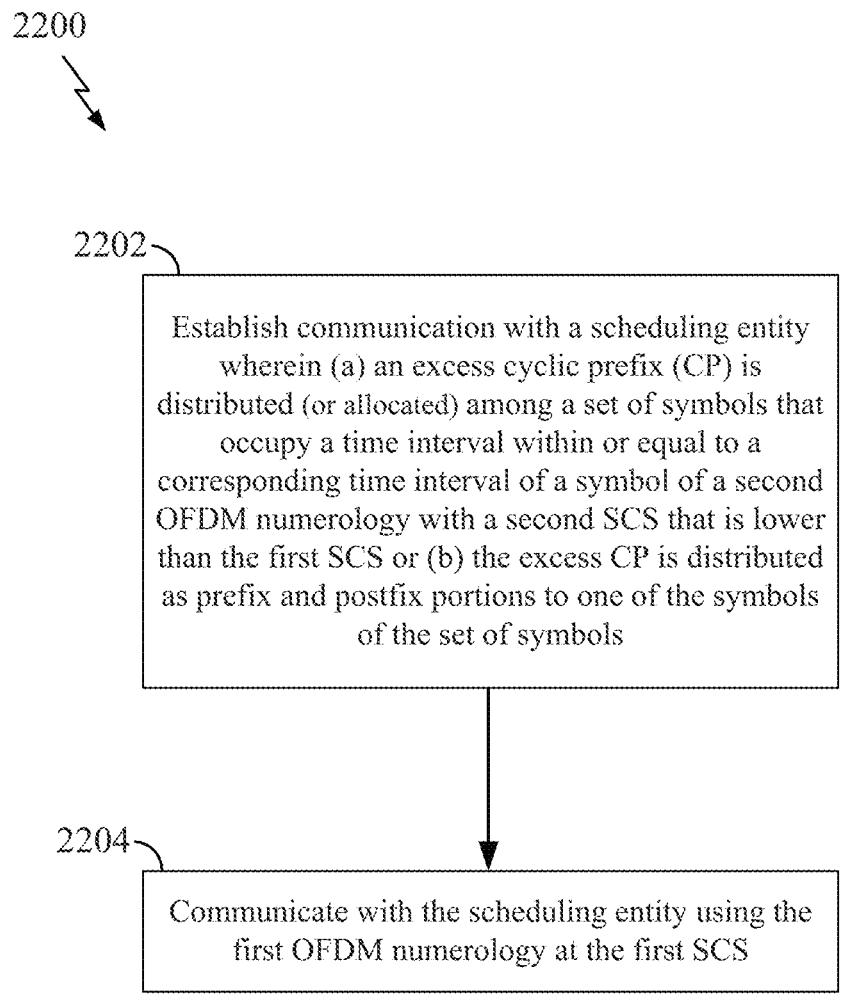
FIG. 22 is a flow chart illustrating a wireless communication method for use by a UE in accordance with aspects of the disclosure, wherein excess CP may be either distributed (or allocated) evenly among a set of symbols or distributed (or allocated) as prefix and postfix portions to a first symbol of a set of symbols.

FIG. 22 is a flow chart illustrating a wireless communication method 2200 according to some aspects of the disclosure. The communication method 2200 may be performed, for example, by a UE or any of the other scheduled entities illustrated in the figures, or by other suitably-equipped systems, devices or apparatus. At block 2202, a UE establishes communication with a scheduling entity (e.g. base station) using a first SCS and a first OFDM numerology wherein (a) an excess CP is distributed (or allocated) among a set of symbols that occupy a time interval within or equal to a corresponding time interval of a symbol of a second OFDM numerology of a second SCS that is lower than the first SCS or (b) the excess CP is distributed (or allocated) as prefix and postfix portions to one of the symbols of the set of symbols. At block 2204, the UE communicates with the scheduling entity using the first OFDM numerology at the first SCS. Additionally, as already noted, communication may also be performed using the second OFDM at the second SCS, and using other OFDM numerologies at still other SCSs.

Figure 23:
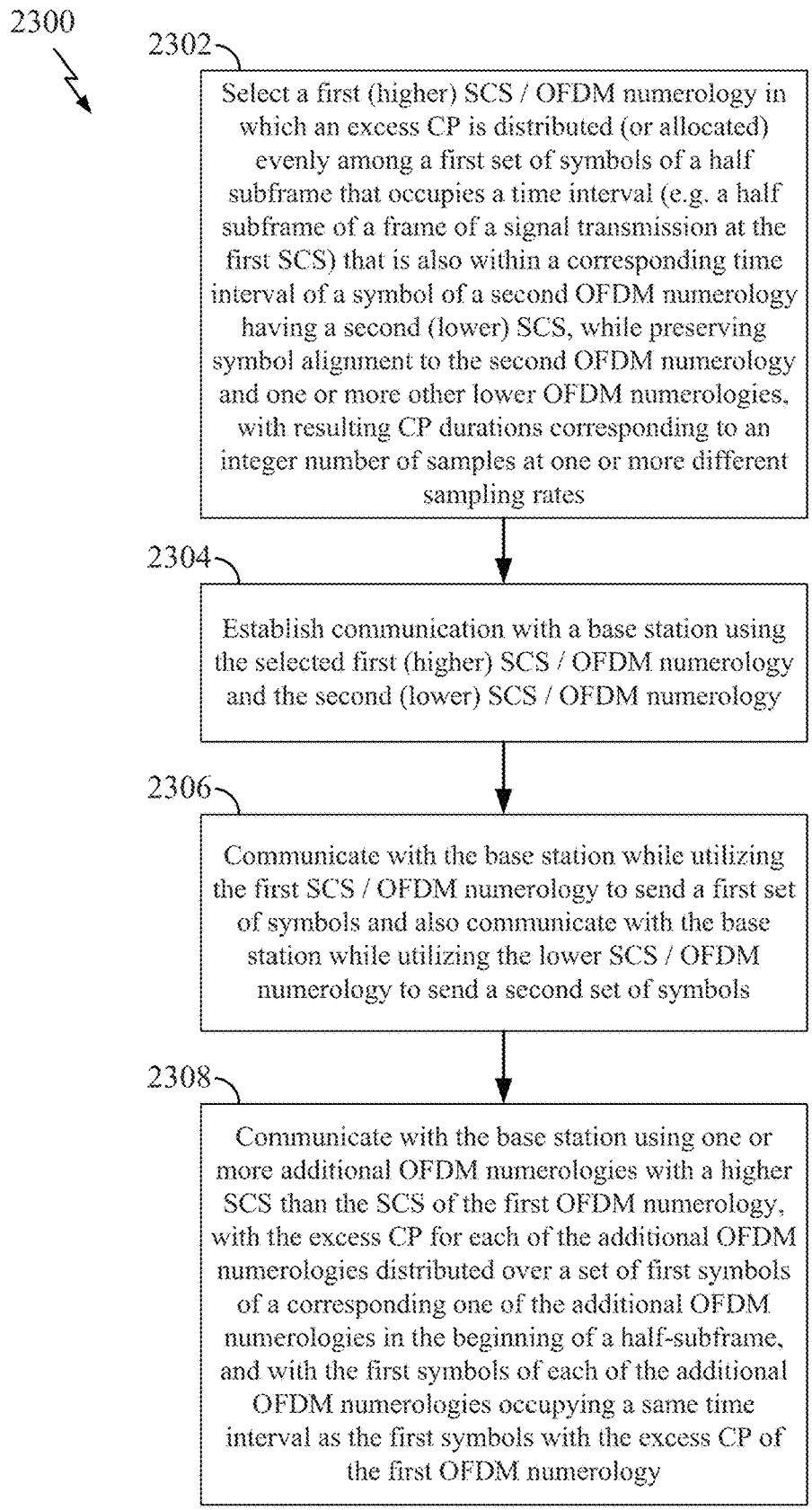
FIG. 23 is another flow chart illustrating a wireless communication method for use by a UE (e.g. scheduled entity) in accordance with aspects of the disclosure), wherein excess CP is distributed evenly among a set of symbols and further illustrating communication using a second OFDM at a second SCS and one or more additional OFDM numerologies.

FIG. 23 is a flow chart illustrating a wireless communication method 2300 according to some aspects of the disclosure that employs features of method (a) of FIG. 22. The communication method 2300 may be performed, for example, by any of the UEs (e.g. scheduled entities) illustrated in the figures, or by other suitably-equipped systems, devices or apparatus. At block 2302, a UE selects a first (higher) SCS/OFDM numerology in which an excess CP is distributed (or allocated) evenly among a first set of symbols of a half subframe that occupies a time interval (e.g. a half subframe of a frame of a signal transmission at the first SCS) that is also within a corresponding time interval of a symbol of a second OFDM numerology having a second (lower) SCS, while preserving or maintaining (or providing for) symbol alignment to the second OFDM numerology and one or more other lower OFDM numerologies, with resulting CP durations corresponding to an integer number of samples at one or more different sampling rates. In some aspects, the number of first symbols (e.g., the first set of symbols) over which the excess CP is evenly distributed is given by (or may be represented by) $2^N$, where N is any integer from 0 to $\log_2$ (1st SCS/2nd SCS).

At block 2304, the UE establishes communication with a base station (e.g. scheduling entity) using the selected first (higher) SCS/OFDM numerology and the second (lower) SCS/OFDM numerology. At block 2306, the US communicates with the base station while utilizing the first SCS/OFDM numerology to send a first set of symbols and also communicates with the base station while utilizing the lower SCS/OFDM numerology to send a second set of symbols. At block 2308, the US may also communicate with the base station using one or more additional OFDM numerologies with a higher SCS than the SCS of the first OFDM numerology, with the excess CP for each of the additional OFDM numerologies distributed over a set of first symbols of a corresponding one of the additional OFDM numerologies in the beginning of a half-subframe, and with the first symbols of each of the additional OFDM numerologies occupying a same time interval as the first symbols with the excess CP of the first OFDM numerology. For illustrative examples of these features see, again, FIGS. 8-10 and their descriptions provided above.

In one configuration, an apparatus for wireless communication includes means for performing the methods and processes as described above, including means for communicating using the numerologies described above. In one aspect, the aforementioned means may be the processor(s) of FIG. 6, 7, 18 or 19 configured to perform the functions recited by the aforementioned means. In another aspect, the aforementioned means may be a circuit or any apparatus configured to perform the functions recited by the aforementioned means. Of course, in the above examples, the circuitry included in the processors of FIGS. 6, 7, 18 and 19 is merely provided as an example, and other means for carrying out the described functions may be included within various aspects of the present disclosure, including but not limited to the instructions stored in the computer-readable storage media FIG. 6, 7, 18, or 19 or any other suitable apparatus or means described in any one of the figures and utilizing, for example, the processes and/or algorithms described herein in relation to the figures.

As noted above, the use of CP keeps inter-symbol interference (between OFDM symbols) outside an FFT window to thereby allow for higher SINR levels with acceptable overhead. The various methods and apparatus described herein (particularly with respect to FIGS. 6-23) accommodate relatively high subcarrier spacings (e.g. 960 kHz, 1920 kHz, and 3840 kHz) with relatively short OFDM symbol durations, while still allowing for high SINR levels with acceptable overhead.

The following provides an overview of examples of the present disclosure.

Example 1: a scheduling entity of a wireless communication system comprises: a communication interface configured for wireless communication and a processor operatively coupled to the communication interface. The processor is configured to: establish communication with a UE using a first SCS and a first OFDM numerology wherein (a) an excess CP is distributed among a set of symbols that occupy a time interval within or equal to a corresponding time interval of a symbol of a second OFDM numerology with a second SCS that is lower than the first SCS or (b) the excess CP is distributed as prefix and postfix portions to one of the symbols of the set of symbols; and communicate with the UE via the communication interface using the first OFDM numerology at the first SCS.

Example 2: the scheduling entity of example 1, wherein the processor is further configured to preserve symbol alignment to the second OFDM numerology and one or more lower OFDM numerologies, with resulting CP durations corresponding to an integer number of samples at one or more sampling rates.

Example 3: the scheduling entity of examples 1 or 2, wherein the processor is further configured to establish the communication with the UE with the time interval of the set of symbols of the first OFDM numerology set to a half subframe of a frame of a signal transmission at the first SCS, with the set of symbols comprising a first set of symbols of the half subframe of the signal transmission.

Example 4: the scheduling entity of examples 1, 2, or 3, wherein the processor is further configured to distribute the excess CP evenly among the set of symbols as extended CPs of equal duration, with each of the extended CPs preceding a corresponding one of the set of symbols.

Example 5: the scheduling entity of examples 1, 2, 3, or 4, wherein the communication interface is configured to transmit with the first SCS set to one of 960 kHz, 1920 kHz, and 3840 kHz and to transmit with the second SCS set to 120 kHz.

Example 6: the scheduling entity of examples 1, 2, 3, 4, or 5, wherein the first SCS is 960 kHz, and wherein the processor is further configured to distribute the excess CP evenly among up to eight initial symbols of a half subframe of a frame of a signal transmission.

Example 7: the scheduling entity of examples 1, 2, 3, 4, 5, or 6, wherein the processor is further configured to communicate using one or more additional OFDM numerologies with a higher SCS than the first SCS, wherein the excess CP for each of the additional OFDM numerologies is distributed over a set of first symbols of a corresponding one of the additional OFDM numerologies in the beginning of a half-subframe, and wherein the first symbols of each of the additional OFDM numerologies occupy a same time interval as the first symbols with the excess CP of the first OFDM numerology.

Example 8: the scheduling entity of examples 1 or 2, wherein the processor is further configured to distribute the excess CP as prefix and postfix portions to a first symbol of the set of symbols.

Example 9: the scheduling entity of examples 1, 2, 3, 4, 5, 6, 7, or 8, wherein the processor is further configured to: establish the communication with the UE using the second OFDM numerology at the second SCS; and communicate with the UE using the communication interface while using the second OFDM numerology at the second SCS.

Example 10: a method of wireless communication at a scheduling entity comprising: establishing communication with a UE using a first SCS and a first OFDM numerology wherein (a) an excess cyclic prefix (CP) is distributed among a set of symbols that occupy a time interval within or equal to a corresponding time interval of a symbol of a second OFDM numerology of a second SCS that is lower than the first SCS or (b) the excess CP is distributed as prefix and postfix portions to one of the symbols of the set of symbols; and communicating with the UE using the first OFDM numerology at the first SCS.

Example 11: the method of example 10, wherein the excess CP is distributed while preserving symbol alignment to the second OFDM numerology and one or more other lower OFDM numerologies, with resulting CP durations corresponding to an integer number of samples at one or more different sampling rates.

Example 12: the method of examples 10 or 11, wherein the time interval of the set of symbols of the first OFDM numerology is a half subframe of a frame of a signal transmission at the first SCS, and the set of symbols is a first set of symbols of the half subframe of the signal transmission.

Example 13: the method of examples 10, 11, or 12, wherein the excess CP is distributed evenly among the set of symbols of the first OFDM numerology as extended CPs of equal duration, with each of the extended CPs preceding a corresponding one of the set of symbols.

Example 14: the method of examples 10, 11, 12, or 13, wherein the first SCS is one of 960 kHz, 1920 kHz, and 3840 kHz, and wherein the second SCS is 120 kHz.

Example 15: the method of examples 10, 11, 12, 13, or 14 wherein the first SCS is 960 kHz, and the excess CP is distributed evenly among up to eight initial symbols of a half subframe of a frame of a signal transmission.

Example 16: the method of examples 10, 11, 12, 13, 14, or 15, further comprising communicating using one or more additional OFDM numerologies with a higher SCS than the SCS of the first OFDM numerology, wherein the excess CP for each of the additional OFDM numerologies is distributed over a set of first symbols of a corresponding one of the additional OFDM numerologies in the beginning of a half-subframe, and where the first symbols of each of the additional OFDM numerologies occupy a same time interval as the first symbols with the excess CP of the first OFDM numerology.

Example 17: the method of examples 10 or 11, wherein the one of the symbols of the set of symbols receiving the excess CP as prefix and postfix portions is a first symbol of the set of symbols.

Example 18: the method of examples 10, 11, 12, 13, 14, 15, 16 or 17 further comprising: establishing the communication with the UE using the second OFDM numerology at the second SCS; and communicating with the UE while utilizing the second OFDM numerology at the second SCS.

Example 19: a UE of a wireless communication system, comprising: a communication interface configured for wireless communication; and a processor operatively coupled to the communication interface. The processor configured to: establish communication with a base station using a first SCS and a first OFDM numerology wherein (a) an excess CP is distributed among a set of symbols that occupy a time interval within or equal to a corresponding time interval of a symbol of a second OFDM numerology with a second SCS that is lower than the first SCS or (b) the excess CP is distributed as prefix and postfix portions to one of the symbols of the set of symbols; and communicate with the base station via the communication interface using the first SCS and the first OFDM numerology.

Example 20: the UE of example 19, wherein the processor is further configured to preserve symbol alignment to the second OFDM numerology and one or more lower OFDM numerologies, with resulting CP durations corresponding to an integer number of samples at one or more sampling rates.

Example 21: the UE of examples 19 or 20, wherein the processor is further configured to distribute the excess CP evenly among the set of symbols as extended CPs of equal duration, with each of the extended CPs preceding a corresponding one of the set of symbols.

Example 22: the UE of examples 19, 20 or 21, wherein the communication interface is configured to transmit with the first SCS set to one of 960 kHz, 1920 kHz, and 3840 kHz and to transmit with the second SCS set to 120 kHz.

Example 23: the UE of examples 19, 20, 21 or 22, wherein the first SCS is 960 kHz, and the processor is further configured to distribute the excess CP evenly among up to eight initial symbols of a half subframe of a frame of a signal transmission.

Example 24: the UE of examples 19 or 20, wherein the processor is further configured to distribute the excess CP as prefix and postfix portions to a first symbol of the set of symbols.

Example 25: a method of wireless communication at a UE, comprising: establishing communication with a base station using a first SCS and a first OFDM numerology wherein (a) an excess CP is distributed among a set of symbols that occupy a time interval within or equal to a corresponding time interval of a symbol of a second OFDM numerology with a second SCS that is lower than the first SCS or (b) the excess CP is distributed as prefix and postfix portions to one of the symbols of the set of symbols; and communicating with the base station using the first OFDM numerology at the first SCS Example 26: the method of example 25, wherein symbol alignment to the second OFDM numerology and other lower OFDM numerologies is preserved, with resulting CP durations corresponding to an integer number of samples at one or more sampling rates.

Example 27: the method of examples 25 or 26, wherein the time interval of the set of symbols of the first OFDM numerology is a half subframe of a frame of a signal transmission at the first SCS and the set of symbols is a first set of symbols of the half subframe of the signal transmission.

Example 28: the method of examples 25, 26, or 27, wherein the first numerology distributes the excess CP evenly among the set of symbols as extended CPs of equal duration, with each of the extended CPs preceding a corresponding one of the set of symbols.

Example 29: the method of examples 25, 26, 27, or 28, further comprising communicating using one or more additional OFDM numerologies with a higher SCS than the SCS of the first OFDM numerology, wherein the excess CP for each of the additional OFDM numerologies is distributed over a set of first symbols of a corresponding one of the additional OFDM numerologies in the beginning of a half-subframe, and where the first symbols of each of the additional OFDM numerologies occupy a same time interval as the first symbols with the excess CP of the first OFDM numerology.

Example 30: the method of examples 25 or 26, wherein the one of the symbols of the set of symbols receiving the excess CP as prefix and postfix portions is a first symbol of the set of symbols.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

While aspects and embodiments are described in this application by illustration to some examples, those skilled in the art will understand that additional implementations and use cases may come about in many different arrangements and scenarios. Features described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range across a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that features described herein may be practiced in a wide variety of devices, chip-level components, systems, distributed arrangements, end-user devices, etc. of varying sizes, shapes and constitution.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-23 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-23 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A scheduling entity of a wireless communication system, comprising:
   a communication interface configured for wireless communication; and
   a processor operatively coupled to the communication interface and configured to:
   establish communication with a user equipment (UE) using a first sub-carrier spacing (SCS) and a first orthogonal frequency-division multiplexing (OFDM) numerology wherein (a) an excess cyclic prefix (CP) is distributed among a set of symbols that occupy a time interval within or equal to a corresponding time interval of a symbol of a second OFDM numerology with a second SCS that is lower than the first SCS or (b) the excess CP is distributed as prefix and postfix portions to one of the symbols of the set of symbols;
wherein the excess CP of (a) or (B) is distributed while maintaining symbol alignment between the first and second OFDM numerologies at sampling rates corresponding to at least one Fast Fourier Transform (FFT) size and at least one decimated version of the FFT; and
communicate with the UE via the communication interface using the first OFDM numerology at the first SCS.

2. The scheduling entity of claim 1, wherein the processor is further configured to establish the communication with the UE with the time interval of the set of symbols of the first OFDM numerology set to a half subframe of a frame of a signal transmission at the first SCS, with the set of symbols comprising a first set of symbols of the half subframe of the signal transmission.

3. The scheduling entity of claim 1, wherein the processor is further configured to communicate using one or more additional OFDM numerologies with a higher SCS than the first SCS, wherein the excess CP for each of the additional OFDM numerologies is distributed over a set of first symbols of a corresponding one of the additional OFDM numerologies in the beginning of a half-subframe, and wherein the first symbols of each of the additional OFDM numerologies occupy a same time interval as the first symbols with the excess CP of the first OFDM numerology.

4. The scheduling entity of claim 1, wherein the processor is further configured to distribute the excess CP as prefix and postfix portions to a first symbol of the set of symbols, and wherein the prefix portion comprises both excess CP and nominal CP and the postfix portion includes only excess CP.

5. The scheduling entity of claim 1, wherein the processor is further configured to:
establish the communication with the UE using the second OFDM numerology at the second SCS; and
communicate with the UE using the communication interface while using the second OFDM numerology at the second SCS.

6. The scheduling entity of claim 1, wherein the processor is further configured to distribute the excess CP only among an initial number of symbols of a half subframe of a frame of a signal transmission, wherein the initial number of symbols comprises a power of two.

7. The scheduling entity of claim 1, wherein the processor is further configured to select an FFT size of 4096.

8. The scheduling entity of claim 1, wherein the processor is further configured to select a decimation factor of sixteen.

9. The scheduling entity of claim 1, wherein the processor is further configured to distribute the excess CP so the prefix and postfix portions are of unequal size.

10. The scheduling entity of claim 1, wherein the processor is further configured to distribute the excess CP so that each symbol receiving a portion of the distributed excess CP comprises a CP that includes a copy of a tail portion of the symbol.

11. The scheduling entity of claim 1, wherein the processor is further configured to perform beam switching during the postfix portion.

12. The scheduling entity of claim 1, wherein the processor is further configured to control communication with all or any subset of a group of SCSs in one or more selected numerologies.

13. A method of wireless communication at a scheduling entity, comprising:
establishing communication with a user equipment (UE) using a first sub-carrier spacing (SCS) and a first orthogonal frequency-division multiplexing (OFDM) numerology wherein (a) an excess cyclic prefix (CP) is distributed among a set of symbols that occupy a time interval within or equal to a corresponding time interval of a symbol of a second OFDM numerology of a second SCS that is lower than the first SCS or (b) the excess CP is distributed as prefix and postfix portions to one of the symbols of the set of symbols;
wherein the excess CP of (a) or (B) is distributed while maintaining symbol alignment between the first and second OFDM numerologies at sampling rates corresponding to at least one Fast Fourier Transform (FFT) size and at least one decimated version of the FFT; and
communicating with the UE using the first OFDM numerology at the first SCS.

14. The method of claim 13, wherein the time interval of the set of symbols of the first OFDM numerology is a half subframe of a frame of a signal transmission at the first SCS, and the set of symbols is a first set of symbols of the half subframe of the signal transmission.

15. The method of claim 13, further comprising communicating using one or more additional OFDM numerologies with a higher SCS than the SCS of the first OFDM numerology, wherein the excess CP for each of the additional OFDM numerologies is distributed over a set of first symbols of a corresponding one of the additional OFDM numerologies in the beginning of a half-subframe, and where the first symbols of each of the additional OFDM numerologies occupy a same time interval as the first symbols with the excess CP of the first OFDM numerology.

16. The method of claim 13, wherein the one of the symbols of the set of symbols receiving the excess CP as prefix and postfix portions is a first symbol of the set of symbols, and wherein the prefix portion comprises both excess CP and nominal CP and the postfix portion includes only excess CP.

17. The method of claim 13, further comprising:
establishing the communication with the UE using the second OFDM numerology at the second SCS; and
communicating with the UE while utilizing the second OFDM numerology at the second SCS.

18. A user equipment (UE) of a wireless communication system, comprising:
a communication interface configured for wireless communication; and
a processor operatively coupled to the communication interface and configured to:
establish communication with a base station using a first sub-carrier spacing (SCS) and a first orthogonal frequency-division multiplexing (OFDM) numerology wherein (a) an excess cyclic prefix (CP) is distributed among a set of symbols that occupy a time interval within or equal to a corresponding time interval of a symbol of a second OFDM numerology with a second SCS that is lower than the first SCS or (b) the excess CP is distributed as prefix and postfix portions to one of the symbols of the set of symbols;
wherein the excess CP of (a) or (B) is distributed while maintaining symbol alignment between the first and second OFDM numerologies at sampling rates corresponding to at least one Fast Fourier Transform (FFT) size and at least one decimated version of the FFT; and communicate with the base station via the communication interface using the first SCS and the first OFDM numerology.

19. The UE of claim 18, wherein the processor is further configured to distribute the excess CP as prefix and postfix portions to a first symbol of the set of symbols, and wherein the prefix portion comprises both excess CP and nominal CP and the postfix portion includes only excess CP.

20. The UE of claim 18, wherein the processor is further configured to distribute the excess CP only among an initial number of symbols of a half subframe of a frame of a signal transmission, wherein the initial number of symbols comprises a power of two.

21. The UE of claim 18, wherein the processor is further configured to select an FFT size of 4096.

22. The UE of claim 18, wherein the processor is further configured to select a decimation factor of sixteen.

23. The UE of claim 18, wherein the processor is further configured to distribute the excess CP so the prefix and postfix portions are of unequal size.

24. The UE of claim 18, wherein the processor is further configured to distribute the excess CP so that each symbol receiving a portion of the distributed excess CP comprises a CP that includes a copy of a tail portion of the symbol.

25. The UE of claim 18, wherein the processor is further configured to perform beam switching during the postfix portion.

26. The UE of claim 18, wherein the processor is further configured to control communication with all or any subset of a group of SCSs in one or more selected numerologies.

27. A method of wireless communication at a user equipment (UE), comprising:
   establishing communication with a base station using a first sub-carrier spacing (SCS) and a first orthogonal frequency-division multiplexing (OFDM) numerology wherein (a) an excess cyclic prefix (CP) is distributed among a set of symbols that occupy a time interval within or equal to a corresponding time interval of a symbol of a second OFDM numerology with a second SCS that is lower than the first SCS or (b) the excess CP is distributed as prefix and postfix portions to one of the symbols of the set of symbols;
   wherein the excess CP of (a) or (B) is distributed while maintaining symbol alignment between the first and second OFDM numerologies at sampling rates corresponding to at least one Fast Fourier Transform (FFT) size and at least one decimated version of the FFT; and
   communicating with the base station using the first OFDM numerology at the first SCS.

28. The method of claim 27, wherein the time interval of the set of symbols of the first OFDM numerology is a half subframe of a frame of a signal transmission at the first SCS and the set of symbols is a first set of symbols of the half subframe of the signal transmission.

29. The method of claim 27, further comprising communicating using one or more additional OFDM numerologies with a higher SCS than the SCS of the first OFDM numerology, wherein the excess CP for each of the additional OFDM numerologies is distributed over a set of first symbols of a corresponding one of the additional OFDM numerologies in the beginning of a half-subframe, and where the first symbols of each of the additional OFDM numerologies occupy a same time interval as the first symbols with the excess CP of the first OFDM numerology.

30. The method of claim 27, wherein the one of the symbols of the set of symbols receiving the excess CP as prefix and postfix portions is a first symbol of the set of symbols, and wherein the prefix portion comprises both excess CP and nominal CP and the postfix portion includes only excess CP.

* * * * *